United States Patent
Zhao et al.

(10) Patent No.: US 11,914,669 B2
(45) Date of Patent: Feb. 27, 2024

(54) APPROXIMATE NEAREST NEIGHBOR SEARCH FOR SINGLE INSTRUCTION, MULTIPLE THREAD (SIMT) OR SINGLE INSTRUCTION, MULTIPLE DATA (SIMD) TYPE PROCESSORS

(71) Applicant: Baidu USA, LLC, Sunnyvale, CA (US)

(72) Inventors: Weijie Zhao, Sunnyvale, CA (US); Shulong Tan, Santa Clara, CA (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 80 days.

(21) Appl. No.: 17/095,548

(22) Filed: Nov. 11, 2020

(65) Prior Publication Data

US 2021/0157606 A1 May 27, 2021

Related U.S. Application Data

(60) Provisional application No. 62/940,043, filed on Nov. 25, 2019.

(51) Int. Cl.
*G06F 17/10* (2006.01)
*G06F 9/30* (2018.01)
(Continued)

(52) U.S. Cl.
CPC ............ *G06F 17/10* (2013.01); *G06F 9/3009* (2013.01); *G06F 9/3887* (2013.01);
(Continued)

(58) Field of Classification Search
None
See application file for complete search history.

(56) References Cited

U.S. PATENT DOCUMENTS 7,296,009 B1   11/2007   Jiang et al.
10,210,180 B2   2/2019   Barel et al.
(Continued)

FOREIGN PATENT DOCUMENTS

CN   101432684 A   5/2009
CN   106549675 A   3/2017
(Continued)

OTHER PUBLICATIONS

The Extended European Search Report dated Apr. 30, 2021, in European Application No. EP20209585. (11 pgs).
(Continued)

*Primary Examiner* — Belix M Ortiz Ditren
(74) *Attorney, Agent, or Firm* — NORTH WEBER & BAUGH LLP

(57) ABSTRACT

Approximate nearest neighbor (ANN) searching is a fundamental problem in computer science with numerous applications in area such as machine learning and data mining. For typical graph-based ANN methods, the searching method is executed iteratively, and the execution dependency prohibits graphics processor unit (GPU)/GPU-type processor adaptations. Presented herein are embodiments of a novel framework that decouples the searching on graph methodology into stages, in order to parallel the performance-crucial distance computation. Furthermore, in one or more embodiments, to obtain better parallelism on GPU-type components, also disclosed are novel ANN-specific optimization methods that eliminate dynamic memory allocations and trade computations for less memory consumption. Embodiments were empirically compared against other methods, and the results confirm the effectiveness.

20 Claims, 19 Drawing Sheets

(51) Int. Cl.
  *G06F 9/38* (2018.01)
  *G06F 9/48* (2006.01)
  *G06F 18/2323* (2023.01)
  *G06F 18/2413* (2023.01)
(52) U.S. Cl.
  CPC ........ *G06F 9/4881* (2013.01); *G06F 18/2323* (2023.01); *G06F 18/24147* (2023.01)

(56) References Cited

U.S. PATENT DOCUMENTS

| | | | |
|---|---|---|---|
| 11,309,087 | B2 | 4/2022 | Holcomb |
| 2003/0120630 | A1 | 6/2003 | Tunkelang |
| 2007/0192316 | A1 | 8/2007 | Lee |
| 2008/0172375 | A1 | 7/2008 | Burges |
| 2019/0065594 | A1 | 2/2019 | Lytkin |
| 2019/0377792 | A1* | 12/2019 | Zhang ................ G06N 5/022 |
| 2021/0157851 | A1* | 5/2021 | Aoyama ............. G06F 16/906 |

FOREIGN PATENT DOCUMENTS

| | | | |
|---|---|---|---|
| CN | 108710626 | A | 10/2018 |
| CN | 110008256 | A | 7/2019 |
| CN | 110326253 | A | 10/2019 |
| CN | 110476151 | A | 11/2019 |
| DK | 177161 | B1 | 3/2012 |
| EP | 3779733 | A1 | 2/2021 |

OTHER PUBLICATIONS

Zhao et al.,"SONG: Approximate Nearest Neighbor Search on GPU," In 2020 IEEE 36th International Conference on Data Engineering (ICDE), 2020. (12pgs).
Groh et al.,"GGNN: Graph-based GPU Nearest Neighbor Search," arXiv preprint arXiv:1912.01059, 2019. (10pgs).
Malkov et al.,"Efficient and Robust Approximate Nearest Neighbor Search Using Hierarchical Navigable Small World Graphs," In IEEE Transactions On Pattern Analysis And Machine Intelligence, vol. 42, No. 4, Apr. 2020. (13pgs).
Wang et al.,"A Comprehensive Survey and Experimental Comparison of Graph-Based Approximate Nearest Neighbor Search," arXiv preprint arXiv: 2101.12631, 2021. (22pgs).
Non-Final Office Action dated Aug. 3, 2022, in related U.S. Appl. No. 17/033,791 (10pgs).
Naidan et al.,"Permutation Search Methods are Efficient, Yet Faster Search is Possible," arXiv preprint arXiv:1506.03163v1, 2015. (13 pgs).
Hyvonen et al., "Fast Nearest Neighbor Search through Sparse Random Projections and Voting," In 2016 IEEE International Conference on Big Data (Big Data), 2016. (8 pgs).
Non-Final Office Action dated Jul. 18, 2022, in related U.S. Appl. No. 17/023,283 (10pgs).
Liu et al.,"Understanding and Improving Proximity Graph Based Maximum Inner Product Search," In The Thirty-Fourth AAAI Conference on Artificial Intelligence (AAAI-20), 2020. (8pgs).
Response filed Dec. 1, 2021, In European Patent Application No. EP20 209 585.7. (28 pgs).
Weston et al.,"Large scale image annotation: learning to rank with joint word-image embeddings," Machine Learning, 2010. (16 pgs).
Xue et al.,"Deep matrix factorization models for recommender systems," In Proceedings of the 26th International Joint Conference on Artificial Intelligence (IJCAI), 2017.(7pgs.
Yan et al.,"Norm-ranging LSH for maximum inner product search," In Advances in Neural Information Processing Systems (NeurIPS), 2018. (10pgs).
Yu et al.,"A greedy approach for budgeted maximum inner product search," In Advances in Neural Information Processing Systems (NIPS), 2017. (10pgs).
Yu et al.,"Large-scale multi-label learning with missing labels," In Proceedings of the 31th International Conference on Machine Learning (ICML), 2014. (9pgs).
Zhao et al.,"SONG: Approximate Nearest Neighbor Search on GPU," In 35th IEEE International Conference on Data Engineering (ICDE) [Abstract], 2020. (3pgs).
Garcia et al.,"Fast k nearest neighbor search using gpu," arXiv preprint arXiv:0804.1448, 2008. (15pgs).
Garcia et al.,"K-nearest neighbor search: Fast GPU-based implementations and application to high-dimensional feature matching," In ICIP, 2010. (4pgs).
Ge et al.,"Optimized product quantization for approximate nearest neighbor search," In CVPR, 2013. (8pgs).
Gionis et al.,"Similarity search in high dimensions via hashing," In VLDB, 1999. (12pgs).
Goemans et al.,"Improved approximation algorithms for maximum cut and satisfiability problems using semidefinite programming," Journal of ACM, 42(6):1115-1145, 1995. (31 pgs).
Hajebi et al.,"Fast approximate nearest-neighbor search with k-nearest neighbor graph," In IJCAI, 2011. (6 pgs).
Hart et al.,"A formal basis for the heuristic determination of minimum cost paths," IEEE transactions on Systems Science and Cybernetics, 1968. [Abstract] (2 pgs).
He et al.,"In-cache query co-processing on coupled cpu-gpu architectures," VLDB, 2014. (12pgs).
Hong et al.,"Accelerating cuda graph algorithms at maximum warp," In SIGPLAN, 2011. (10 pgs).
Huang et al.,"Query-aware locality-sensitive hashing for approximate nearest neighbor search," VLDB, 2015. (13pgs).
G. T. Toussaint,"The relative neighbourhood graph of a finite planar set," Pattern recognition, 12(4):261-268, 1980. [Abstract] (3pgs).
Wang et al.,"FLASH: Randomized algorithms accelerated over CPUGPU for ultra-high dimensional similarity search," arXiv preprint arXiv:1709.01190, 2018. (15 pgs).
Wang et al.,"Gunrock: A high-performance graph processing library on the gpu," In SIGPLAN 2016. (12 pgs).
Wu et al.,"Multiscale quantization for fast similarity search," In NIPS, 2017. (11pgs).
Wu et al.,"Fast and unified local search for random walk based knearest-neighbor query in large graphs," In SIGMOD, 2014. (12pgs).
Zhang et al.,"Finepar: Irregularity-aware fine-grained workload partitioning on integrated architectures," In CGO, 2017. (13 pgs).
Zheng et al.,"LazyIsh: Approximate nearest neighbor search for multiple distance functions with a single index," In SIGMOD, 2016. (15 pgs).
Zhou et al.,"Mobius transformation for fast inner product search on graph," In NeurIPS, 2019. (12 pgs).
Fan et al.,"MOBIUS: Towards the Next Generation of Query-Ad Matchingin Baidu's Sponsored Search,", In Proceedings of the 25th ACM SIGKDD International Conference on Knowledge Discovery & Data Mining, (KDD), 2019. (9pgs).
S. Fortune,"Voronoi diagrams and delaunay triangulations,"In Handbook of Discrete & Computational Geometry, 1995. (12pgs).
Friedman et al.,"An algorithm for finding nearest neighbors," IEEE Transactions on Computers [Abstract], 1975. (3pgs).
Friedman et al.,"An algorithm for finding best matches in logarithmic expected time,"ACM Transactions on Mathematical Software, 1977. (39pgs).
Fu et al.,"Fast Approximate Nearest Neighbor Search With TheNavigating Spreading-out Graph," arXiv preprint arXiv:1707.00143, 2018. (21pgs).
George et al.,"Delaunay triangulation and meshing," 1998. (1pg).
Guo et al.,"Quantization based Fast Inner Product Search," arXiv preprint arXiv:1509.01469, 2015. (17pgs).
He et al.,"Neural Collaborative Filtering," arXiv preprint arXiv:1708. 05031, 2017. (10pgs).
Hu et al.,"Collaborative filtering for implicit feedback datasets," In Proceedings of the 8th IEEE International Conference on Data Mining (ICDM), 2008. (10pgs).

(56) References Cited

OTHER PUBLICATIONS

Levy et al.,"A strong baseline for learning cross-lingual word embeddings from sentence alignments," In Proceedings of the 15th Conference of the European Chapter of the Association for Computational Linguistics, vol. 1, pp. 765-774, 2017. (10 pgs).
Li et al.,"GPU-Based Minwise Hashing," In Proceedings of the 21st World Wide Web Conference (WWW), 2012. (2pgs).
Liu et al.,"Representation learning using multi-task deep neural networks for semantic classification and information retrieval," In Proceedings of the 2015 Conference of the North American Chapter of the Association for Computational Linguistics: Human Language Technologies (NAACL-HLT), 2015. (10pgs).
Mikolov et al.,"Efficient estimation of word representations in vector space," arXiv preprint arXiv:1301.3781, 2013. (12pgs).
Mikolov et al.,"Distributed representations of words and phrases and their compositionality," In Advances in Neural Information Processing Systems (NIPS), 2013. (9pgs).
Andoni et al.,"Practical and optimal LSH for angular distance," In NIPS, 2015. (16pgs).
Arora et al.,"HD-Index: Pushing the scalability-accuracy boundary for approximate KNN search in high-dimensional spaces," arXiv preprint arXiv:1804.06829, 2018. (16pgs).
Arvind et al.,"Symmetric min-max heap: a simpler data structure for double-ended priority queue," Information Processing Letters, 69(4):197-199, 1999. (3pgs).
Aumuller et al.,"Ann-benchmarks: A benchmarking tool for approximate nearest neighbor algorithms," arXiv preprint arXiv:1807.05614, 2018. (20pgs).
F. Aurenhammer,"Voronoi diagrams—A survey of a fundamental geometric data structure," ACM Computing Surveys, vol. 23, No. 3, Sep. 1991. (61pgs).
Baranchuk et al.,"Revisiting the Inverted Indices for Billion-Scale Approximate Nearest Neighbors," In ECCV, 2018. (15pgs).
A. Z. Broder,"On the resemblance and containment of documents," In the Compression and Complexity of Sequences, 1997. (9pgs).
L. Cayton,"Fast nearest neighbor retrieval for bregman divergences," In ICML, 2008. (8pgs).
M. S. Charikar,"Similarity Estimation Techniques from Rounding Algorithms," In STOC, 2002. (9pgs).
Chen et al.,"Robust and fast similarity search for moving object trajectories," In SIGMOD, 2005. (12pgs).
Xu et al.,"Deep learning for matching in search and recommendation," In The 41st International ACM SIGIR Conference on Research and Development in Information Retrieval (SIGIR), 2018. (55pgs).
Yan et al.,"Norm-ranging lsh for maximum inner product search,"In Advances in Neural Information Processing Systems (NeurIPS),2018. (10pgs).
Yoon et al.,"Synonym discovery with etymology-based word embeddings," arXiv preprint arXiv:1709.10445, 2017. (6pgs).
Yu et al.,"A greedy approach for budgeted maximum inner product search," arXiv preprint arXiv:1610.03317, 2016. (21pgs).
Zhao et al.,"SONG: Approximate Nearest Neighbor Search on GPU," 2020 IEEE 36th International Conference on Data Engineering (ICDE), 2020. (12 pgs).
Acree et al.,"Comparing and evaluating cosine similarity scores, weighted cosine similarity scores and substring matching," Technical report, 2016. [Abstract] (1pg).
Agirre et al.,"SemEval-2012 Task 6: A Pilot on Semantic Textual Similarity," In Proceedings of the 1st Joint Conference on Lexical & Computational Semantics (SEM), 2012.(9pgs).
F. Aurenhammer,"Voronoi Diagrams—a survey of a fundamental geometric data structure," ACM Computing Surveys (CSUR), 23(3):345-405,1991. (61pgs).
Bachrach et al.,"Speeding up the Xbox recommender system using a euclidean transformation for inner-product spaces," In Proceedings of the 8th ACM Conference on Recommender systems (RecSys), 2014. (8pgs).
C. Bradford Barber et al.,"The Quickhull Algorithm for Convex Hulls," ACM Transactions on Mathematical Software (TOMS), 22(4):469-483, 1996. (15pgs).

Bengio et al.,"A neural probabilistic language model," Journal of Machine Learning Research, 2003. (19pgs).
Cignoni et al.,"DeWall: A fast divide and conquer delaunay triangulation algorithm in Ed," Computer-Aided Design, 30(5):333-341,1998. [Abstract] (3 pgs).
Faruqui et al.,"Problems with evaluation of word embeddings using word similarity tasks," arXiv preprint arXiv:1605.02276, 2016. (6 pgs).
Friedman et al.,"An algorithm for finding nearest neighbors," In IEEE Transactions on Computers, 24:1000-1006, 1975. [Abstract] (3pgs).
Neyshabur et al.,"On symmetric and asymmetric lshs for inner product search," In Proceedings of the 32nd International Conference on Machine Learning (ICML), 2015. (9pgs).
Ram et al.,"Maximum inner-product search using cone trees," In The 18th ACM SIGKDD International Conference on Knowledge Discovery & Data Mining (KDD), 2012. (9pgs).
Shrivastava et al.,"Asymmetric LSH (ALSH) for sublinear time maximum inner product search (MIPS)," arXiv preprint arXiv:1405.5869, 2014. (19pgs).
Shrivastava et al.,"Asymmetric minwise hashing for indexing binary inner products and set containment," In Proceedings of the 24th International Conference on World Wide Web (WWW), 2015. (11 pgs).
Shrivastava et al.,"Improved asymmetric locality sensitive hashing (ALSH) for maximum inner product search (MIPS)," In Proceedings of the 31st Conference on Uncertainty in Artificial Intelligence (UAI), 2015. (10pgs).
Tan et al.,"On Efficient Retrieval of Top Similarity Vectors," In Proceedings of the 2019 Conference on Empirical Methods in Natural Language Processing (EMNLP), 2019. (11 pgs).
Tan et al.,"Fast item ranking under neural network based measures," In Proceedings of the 13th ACM International Conference on Web Search & Data Mining (WSDM), 2020. (9pgs).
Vaswani et al.,"Attention is all you need," In Advances in Neural Information Processing Systems (NIPS), 2017. (11pgs).
Pennington et al.,"Glove: Global vectors for word representation," In Empirical Methods in Natural Language Processing (EMNLP), 2014. (12 pgs).
Plank et al.,"Embedding semantic similarity in tree kernels for domain adaptation of relation extraction," In Proceedings of the 51st Annual Meeting of the Association for Computational Linguistics (ACL), vol. 1, pp. 1498-1507, 2013. (10pgs).
Putra et al.,"Evaluating text coherence based on semantic similarity graph," In Proceedings of TextGraphs-11: the Workshop on Graph-based Methods for Natural Language Processing, pp. 76-85, 2017. (10pgs).
Ramage et al.,"Random walks for text semantic similarity," In Proceedings of the 2009 workshop on graph-based methods for natural language processing, 2009. (9pgs).
Sahami et al.,"A web-based kernel function for measuring the similarity of short text snippets," In Proceedings of the 15th International Conference on World Wide Web (WWW), 2006. (10pgs).
Shrivastava et al.,"Asymmetric LSH (ALSH) for sublinear time maximum inner product search (MIPS)," In Advances in Neural Information Processing Systems (NIPS), 2014. (9pgs).
Shrivastava et al.,"Improved asymmetric locality sensitive hashing (ALSH) for maximum inner product search (MIPS)," arXiv preprint arXiv:1410.5410, 2014. (9pgs).
Curtin et al.,"Fast exact max-kernel search," arXiv preprint arXiv:1210.6287, 2012. (12pgs).
de Vries et al.,"Efficient k-NN search on vertically decomposed data," In SIGMOD, 2002. (12pgs).
Dearholt et al.,"Monotonic search networks for computer vision databases," In ACSSC, 1988. [Abstract] (6 pgs).
Fan et al.,"Cuckoo filter: Practically better than bloom," In CoNEXT, 2014. (13pgs).
Fan et al.,"MOBIUS: towards the next generation of query-ad matching in baidu's sponsored search," In KDD 2019. [Abstract] (5 pgs).
Friedman et al.,"An algorithm for finding nearest neighbors," IEEE Transactions on Computers, 24:1000-1006, 1975. (22pgs).

(56) References Cited

OTHER PUBLICATIONS

Friedman et al.,"An algorithm for finding best matches in logarithmic expected time," ACM Transactions on Mathematical Software, 3:209-226, 1977. (18pgs).
Fu et al.,"Efanna: An extremely fast approximate nearest neighbor search algorithm based on knn graph," arXiv preprint arXiv:1609.07228, 2016. (20pgs).
Fu et al.,"MapGraph: A High Level API for Fast Development of High Performance Graph Analytics on GPUs," In Grades, 2014. (6pgs).
Indyk et al.,"Approximate nearest neighbors:Towards removing the curse of dimensionality," In STOC, 1998. (10 pgs).
Jegou et al.,"Product quantization for nearest neighbor search," IEEE transactions on pattern analysis and machine intelligence, 33(1):117-128, 2011. (14pgs).
Jegou et al.,"Hamming embedding and weak geometric consistency for large scale image search," In ECCV, 2008. (15pgs).
Jia et al.,"Dissecting the NVIDIA volta GPU architecture via microbenchmarking," arXiv preprint arXiv:1804.06826, 2018. (66 pgs).
Jin et al.,"Fast and accurate hashing via iterative nearest neighbors expansion," IEEE Trans. Cybernetics, 44(11):2167-2177, 2014. [Abstract] (3 pgs).
Khorasani et al.,"CuSha: Vertex-centric graph processing on GPUs," In HPDC, 2014. (13pgs).
Kim et al.,"Gts: A fast and scalable graph processing method based on streaming topology to GPUs," In SIGMOD, 2016. [Abstract] (4pgs).
P. Li.,"Linearized GMM kernels and normalized random Fourier features," In KDD 2017, 2017. (10pgs).
Li et al.,"Sign cauchy projections and chi-square kernel," In NIPS 2013. (9pgs).
Response filed Oct. 18, 2022, in related U.S. Appl. No. 17/023,283 (8pgs).
Srinivas et al.,"A weighted tag similarity measure based on a collaborative weight model," In Proceedings of the 2nd International Workshop on Search and Mining User-Generated Contents, 2010. (8pgs).
Sugawara et al.,"On approximately searching for similar word embeddings," In Proceedings of the 54th Annual Meeting of the Association for Computational Linguistics (ACL), 2016. (11 pgs).
Sultan et al.,"Bayesian supervised domain adaptation for short text similarity," In Proceedings of the 2016 Conference of the North American Chapter of the Association for Computational Linguistics: Human Language Technologies (NAACL-HLT), 2016. (10pgs).
Sun et al.,"A simple approach to learn polysemous word embeddings," arXiv preprint arXiv:1707.01793, 2017. (9 pgs).
Tan et al.,"Fast Item Ranking under Neural Network based Measures," Proceedings of the 13th International Conference on Web Search and Data Mining, 2020. [Abstract] (7pgs).
Wu et al.,"Multiscale quantization for fast similarity search," In Advances in Neural Information Processing Systems (NIPS), 2017. (11pgs).
Morozov et al.,"Non-metric similarity graphs for maximum inner product search," In NIPS, 2018. (10pgs).
Muja et al.,"Scalable nearest neighbor algorithms for high dimensional data," Pattern Analysis and Machine Intelligence, IEEE Transactions on, 36, 2014. (14pgs).
Ram et al.,"Maximum inner-product search using cone trees," In KDD, 2012. (9pgs).
H. Seo et al.,"GStream: A graph streaming processing method for large-scale graphs on GPUs," In SIGPLAN, 2015. (43pgs).
X. Shi et al.,"Graph processing on gpus: A survey," CSUR, 2018. (35pgs).
X. Shi et al.,"Optimization of asynchronous graph processing on GPU with hybrid coloring model," SIGPLAN, 2015. (3pgs).
Shrivastava et al.,"Fast near neighbor search in high-dimensional binary data," In ECML, 2012. (38pgs).
Tan et al.,"Fast item ranking under neural network based measures," In WSDM, 2020. [Abstract] (3pgs).
Tan et al.,"On efficient retrieval of top similarity vectors," In EMNLP, 2019. (11pgs).
Teodoro et al.,"Approximate similarity search for online multimedia services on distributed CPU-GPU platforms," arXiv preprint arXiv:1209.0410, 2012. (25pgs).
Li et al.,"GPU-based minwise hashing:Gpu-based minwise hashing," In WWW 2012, 2012. [Abstract] (4pgs).
W. Li et al.,"Approximate nearest neighbor search on high dimensional data: Experiments, analyses, and improvement," arXiv preprint arXiv:1610.02455, 2016. (26pgs).
W. Litwin,"Linear hashing: a new tool for file and table addressing," In VLDB, 1980. (12pgs).
H. Liu et al.,"iBFS: Concurrent Breadth-First Search on GPUs," In SIGMOD, 2016. (14 pgs).
Liu et al.,"Enterprise: Breadth-first graph traversal on gpus," In SC, 2015. (12pgs).
Malkov et al.,"Approximate nearest neighbor algorithm based on navigable small world graphs," Information Systems, 45:61-68, 2014. (8 pgs).
D. Merrill et al.,"Scalable GPU graph traversal," In SIGPLAN, 2012. (11pgs).
M. Mitzenmacher,"Compressed bloom filters," IEEE/ACM Transactions on Networking (TON), 10(5):604-612, 2002. (9 pgs).
Friedman et al.,"An algorithm for finding best matches in logarithmic expected time," In ACM Transactions on Mathematical Software, 3:209-226, 1977. (18 pgs).
Gao et al.,"Learning continuous phrase representations for translation modeling," In Proceedings of the 52nd Annual Meeting of the Association for Computational Linguistics (ACL), vol. 1, pp. 699-709, 2014. (11pgs).
Gong et al.,"Document similarity for texts of varying lengths via hidden topics," In Proceedings of the 56th Annual Meeting of the Association for Computational Linguistics (ACL), vol. 1, pp. 2341-2351, 2018. (11 pgs).
Guo et al.,"Quantization based fast inner product search," In Artificial Intelligence and Statistics (AISTATS), pp. 482-490, 2016. (9pgs).
Hu et al.,"Collaborative filtering for implicit feedback datasets," In Proceedings of the Eighth IEEE International Conference on Data Mining (ICDM), 2008. (10 pgs).
Huang et al.,"Learning deep structured semantic models for web search using clickthrough data," In Proceedings of the 22nd ACM International Conference on Information Knowledge Management (CIKM), 2013. (8pgs).
Huang et al.,"Accurate and fast asymmetric locality-sensitive hashing scheme for maximum inner product search," In Proceedings of the 24th ACM SIGKDD International Conference on Knowledge Discovery & Data Mining (KDD), pp. 1561-1570, 2018. (10 pgs).
Indyk et al.,"Approximate nearest neighbors: Towards removing the curse of dimensionality," In Proceedings of the 13th Annual ACM Symposium on the Theory of Computing (STOC), 1998. (10 pgs).
Joulin et al.,"Fasttext.zip: Compressing text classification models," arXiv preprint arXiv:1612.03651, 2016. (13 pgs).
Kalantidis et al.,"Locally optimized product quantization for approximate nearest neighbor search," In Proceedings of the IEEE Conference on Computer Vision and Pattern Recognition (CVPR), 2014. (8 pgs).
Koper et al.,"Analogies in complex verb meaning shifts: the effect of affect in semantic similarity models," In Proceedings of the 2018 Conference of the North American Chapter of the Association for Computational Linguistics:Human Language Technologies (NAACLHLT), 2018. (7 pgs).
Lee et al.,"Reasoning in vector space: An exploratory study of question answering," arXiv preprint arXiv:1511.06426, 2016. (12 pgs).
Bachrach et al.,"Speeding up the Xbox recommender system using a Euclidean transformation for inner-product spaces," In 8th ACM Conference on Recommender Systems (ReeSys), 2014. (8pgs).
Barber et al.,"The Quickhull Algorithm for Convex Hulls," ACM Transactions on Mathematical Software (TOMS), 22(4):469-483,1996. (15pgs).

(56) References Cited

OTHER PUBLICATIONS

Beaumont et al.,"VoroNet: A scalable object network based on voronoi tessellations," In 21th International Parallel & Distributed Processing Symposium (IPDPS), 2007. (10pgs).
Bengio et al.,"A Neural Probabilistic Language Model,"Journal of Machine Learning Research, 3:1137-1155, 2003. (19pgs).
L. Cayton,"Fast Nearest Neighbor Retrieval for Bregman Divergences," In Proceedings of the 25th International Conference on Machine learning (ICML), 2008. (8pgs).
Curtin et al.,"Dual-Tree Fast Exact Max-Kernel Search," Statistical Analysis and Data Mining: The ASA Data Science Journal, 7(4):229-253, 2014. (25pgs).
Indyk et al.,"Approximate nearest neighbors: Towards removing the curse of dimensionality,".
In Proceedings of the 30th Annual ACM Symposium on the Theory of Computing (STOC) [Abstract], 1998. (3pgs).
Johnson et al.,"Billion-scale similarity search with GPUs," arXiv preprint arXiv:1702.08734, 2017. (12pgs).
J. Kleinberg,"The small-world phenomenon: an algorithmic perspective," In Proceedings of the 32nd Annual ACM Symposium on Theory of Computing (STOC), 2000. (14pgs).
Kühnel et al.,"Liouville's theorem in conformal geometry," Journal de mathématiques pures et appliquées, 88(3):251-260, 2007. (10pgs).
Li et al.,"GPU-Based Minwise Hashing: GPU-based minwise hashing," In Proceedings of the 21st World Wide Web Conference (WWW) [Abstract], 2012. (2 pgs).
Malkov et al.,"Approximate nearest neighbor algorithm based on navigable small world graphs," Information Systems,[Abstract] 2014. (2pgs).
Malkov et al.,"Efficient and robust approximate nearest neighbor search using hierarchical navigable small world graphs," IEEE transactions on pattern analysis and machine intelligence, 2018. (13pgs).
Morozov et al.,"Non-metric similarity graphs for maximum inner product search," In Advances in Neural Information Processing Systems (NeurIPS), 2018. (10pgs).
Non-Final Office Action dated Feb. 28, 2023, in related U.S. Appl. No. 17/023,283 (13pgs).

Final Office Action dated Jan. 24, 2023, in related U.S. Appl. No. 17/033,791 (21pgs).
Yan et al., "Norm-Ranging LSH for Maximum Inner Product Search," In 32nd Conference on Neural Information Processing Systems (NeurIPS ), 2018. (10 pgs).
Response filed Apr. 24, 2023, in related U.S. Appl. No. 17/033,791. (19pgs).
Response filed May 30, 2023, in related U.S. Appl. No. 17/023,283. (15pgs).
Non-Final Office Action dated Jul. 17, 2023, in related U.S. Appl. No. 17/033,791. (11pgs).
Boytsov et al.," Off the beaten path: Let's replace term-based retrieval with k-NN search," arXiv preprint arXiv:1610.10001v1, 2016. (12pgs).
Kennes et al., "Computational aspects of the Mobius transform," arXiv preprint arXiv: 1304.1122, 2013. (8pgs).
Chinese Office Action dated Aug. 30, 2023, in Chinese Application No. 202011119294.1 (30pgs).
Morozov et al., "Non-metric Similarity Graphs for Maximum Inner Product Search," In 32nd Conference on Neural Information Processing Systems (NeurIPS), 2018. (10pgs).
Final Office Action dated Sep. 13, 2023, in related U.S. Appl. No. 17/023,283. (12pgs).
Response to Non-Final Office Action filed Oct. 17, 2023, in related U.S. Appl. No. 17/033,791. (21 pgs).
Response to Final Office Action filed Nov. 10, 2023, in related U.S. Appl. No. 17/023,283. (12 pgs).
Non-Final Office Action dated Dec. 5, 2023, in related U.S. Appl. No. 17/023,283. (13pgs).
Notice of Allowance & Fee(s) Due dated Jan. 8, 2023, in related U.S. Appl. No. 17/033,791. (19pgs).
Shao et al., "Challenges and techniques for effective and efficient similarity search in large video dataases," Proceedings of the VLDB Endowment, 2008. (6pgs).
Potamias et al., "Nearest-neighbor Queries in Probabilistic Graphs," [online], [Retrieved Jan. 10, 2024]. Retrieved from Internet <URL:https://open.bu.edu/bitstream/handle/2144/1748/2009-024-probabilistic-graph-queries.pdf?sequence=1&isAllowed=y>, 2009. (13pgs).

* cited by examiner

400

(a) Bounded Priority Queue

Initialization  q: 1
                topk: ∅
                visited: 1
Iteration 1  q: 2 7 4
             topk: 1
             visited: 1 2 4 5 7
Iteration 2  q: 8 7 3
             topk: 1 2
             visited: 1 2 3 4 5 7 8
Iteration 3  q: 7 3 4
             topk: 1 2 8
             visited: 1 2 3 4 5 7 8 13 14
Iteration 4  q: 3 4 6
             topk: 7 2 8
             visited: 1 2 3 4 5 6 7 8 13 14

(b) + Selected Insertion

Initialization  q: 1
                topk: ∅
                visited: 1
Iteration 1  q: 2 7 4
             topk: 1
             visited: 1 2 4 5 7
Iteration 2  q: 8 7 3
             topk: 1 2
             visited: 1 2 3 4 5 7 8
Iteration 3  q: 7 3 4
             topk: 1 2 8
             visited: 1 2 3 4 5 7 8
Iteration 4  q: 3 4
             topk: 7 2 8
             visited: 1 2 3 4 5 7 8

(c) + Visited Deletion

Initialization  q: 1
                topk: ∅
                visited: 1
Iteration 1  q: 2 7 4
             topk: 1
             visited: 1 2 4 7
Iteration 2  q: 8 7 3
             topk: 1 2
             visited: 1 2 3 7 8
Iteration 3  q: 7 3 4
             topk: 1 2 8
             visited: 1 2 3 4 7 8
Iteration 4  q: 3 4
             topk: 7 2 8
             visited: 2 3 4 7 8

FIG. 4

APPROXIMATE NEAREST NEIGHBOR SEARCH FOR SINGLE INSTRUCTION, MULTIPLE THREAD (SIMT) OR SINGLE INSTRUCTION, MULTIPLE DATA (SIMD) TYPE PROCESSORS

CROSS-REFERENCE TO RELATED APPLICATION

This patent application is related to and claims priority benefit under 35 USC § 119(e) to commonly-owned U.S. Pat. App. No. 62/940,043, filed on 25 Nov. 2019, entitled "APPROXIMATE NEAREST NEIGHBOR SEARCH FOR PARALLEL PROCESSING HARDWARE COMPONENTS," and listing Weijie Zhao, Shulong Tan, and Ping Li as inventors, which patent document is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to embodiments for improved processing of searches when intended for processing on certain times of processors.

B. Background

Nearest neighbor (NN) searching is a fundamental problem since the early days of computer science with numerous practical applications in many fields—such as machine learning, computer vision, data mining, information retrieval, etc. A challenge of the NN task is to find the nearest neighbor without scanning all data points in the repository of data.

In recent years, methods for approximate near neighbor (ANN) search become popular, because many applications only require finding a "close enough" neighbor instead of the exact nearest solution.

In the ANN searching paradigm, each query is compared with a subset of data points instead of the entire dataset. One of the issues in the ANN searching paradigm is obtaining the subset of data from the entire dataset. To obtain the subset, a variety of index structures have been proposed, including probabilistic hashing, quantization, ball tree or KD tree variants, and graph-based searching, etc.

While these ANN approaches, such as graph-based ANN methods, have been used with some success, they do have drawbacks particularly when dealing with modern processors. For typical graph-based methods, the searching algorithm is executed iteratively, and the execution dependency prohibits graphical processor unit (GPU) adaptations. The inability to effectively utilize powerful hardware tools like GPUs is a significant hinderance.

Accordingly, what is needed are systems and methods for searching that can be implemented to better utilize processing capabilities of single instruction, multiple thread or single instruction, multiple data type processors, such as GPUs.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 4 depicts examples of optimizations, according to embodiments of the present disclosure. The proximity graph referred in these examples is in FIG. 1.

DETAILED DESCRIPTION OF EMBODIMENTS

Figure 1:
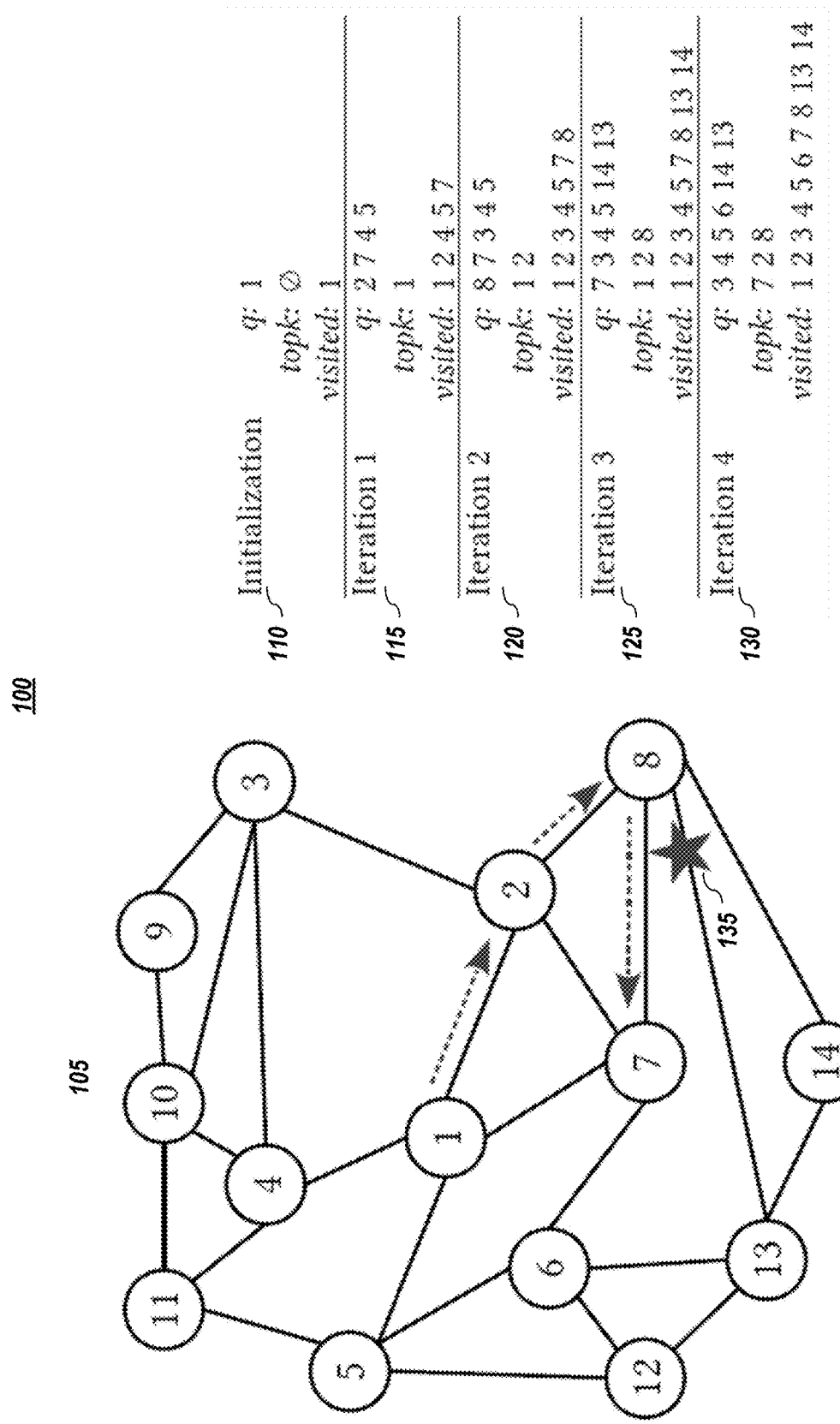
FIG. 1 depicts an example to illustrate a searching method on a proximity graph, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that references to graphics processing units (GPUs) should be construed to cover any single instruction, multiple thread type processors or single instruction, multiple data type processors.

It shall be also noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

As noted above, nearest neighbor (NN) searching is a fundamental problem that has affects numerous applications in many fields. Because of its importance and prevalence, various methods for approximating nearest neighbor search have been developed.

ANN searching methods. In the ANN searching paradigm, each query is compared with a subset of data points instead of the entire dataset. To obtain the subset, a variety of index structures have been proposed, including probabilistic hashing, quantization, ball tree or KD tree variants, and graph-based searching, etc.

Graph-based ANN methods. Recently, graph-based methods have drawn attention. In the literature, extensive experiments show that graph-based methods can outperform other types of ANN methods in common metrics. Typically, these methods build a graph index referred to as a Proximity Graph. Vertices of proximity graph represent the points in the dataset. Edges in the graph illustrate neighborhood relationships between the connecting nodes. The neighborhood relationship is defined on various constraints to make graphs applicable for the ANN problem. For example, some graph constraints like Delaunay Graphs and Monotonic Search Networks guarantee that there exists a path with monotonic decreasing distance to the query point from any starting vertex. A number of different methods—such as Graph Nearest Neighbor Search Algorithm (GNNS), Iterative Expanding Hashing (IEH), Extremely Fast Approximate k-Nearest Neighbor graph construction Algorithm and Extremely Fast Approximate Nearest Neighbor search Algorithm based on kNN graph (EFANNA), Navigating Spreading-out Graph (NSG), Hierarchical Navigable Small World (HNSW) Graph—attempt to approximate the Delaunay Graph or Relative Neighborhood Graph, to reduce the proximity graph construction complexity to subquadratic time. Those approximations make graph-based ANN methods applicable to massive data and become popular tools in industry practice.

Search on graph. Although these methods have diverged constraints on building the graph indices, most of the graph-based methods share a similar heuristic searching methodology (see Method 1, below), which may be considered as a variant of a heuristic search. Its workflow may be considered to be similar to Breadth-First Search (BFS) but with some deviations, such as, for example, the queue in the BFS is replaced with a priority queue q. The priority queue orders vertices ascendingly by the distance to the query point p. The searching process starts from a default starting point. Then, it extracts a vertex from the priority queue q (line 3), updates the top-K candidates (line 4-8), and inserts the neighbors of the vertex into q for future exploration (line 13). The main searching loop (line 2-16) stops when the extracted vertex from the priority queue is worse than the searched top-K result candidates (line 4-5). Abstractly, the method greedily follows a path to reach the nearest neighbor of the query point.

---
Method 1 -- Searching methodology embodiment on a proximity graph
---
Input: Graph index G(V, E); a query point p; number of output candidates K
Output: Top K candidates for each query topk
1. Initialize a binary min-heap as priority queue q and a hash set visited with the default starting point. Construct an empty binary max-heap as priority queue topk
2. while q ≠ ∅ do
3.    (now_dist, now_idx) ← q.pop_min( )
4.    if topk.size=K and topk.peek_max( )<now_dist then
5.       break
6.    else
7.       topk.push_heap((now_dist, now_idx))
8.    end if
9.    for each (now_idx, v) ∈ E do
10.      if visited.exist(v) ≠ true then
11.         d ← dist(p,v)
12.         visited.insert(v)
13.         q.push_heap((d,v))
14.      end if
15.    end for
16. end while
17. return topk
---

FIG. 1 illustrates an example of Method 1, according to embodiments of the present disclosure. Specifically, FIG. 1 depicts an example to illustrate a searching method on a proximity graph, according to embodiments of the present disclosure. The star 135 represents the query point p. In this example, a target is to find the top K=3 nearest neighbors of p. Vertex 1 is the default starting point in this example. The searching path 1→2→8→7 is highlighted by the dashed arrows. The right part shows the states of two priority queues—q and topk—and the hash table visited in each iteration, from initialization 110 through the fourth iteration 130.

Parallelism. The searching procedure is typically executed iteratively—each iteration relies on the progress of the previous one. The execution dependency prohibits any embarrassingly-parallel solutions for this method. The conventional parallel solution for graph-based ANN is to execute different queries concurrently on multi-core CPUs. There are few studies that discussed the GPU adaptation for graph-based methods. However, without considering the architecture of GPUs, a query-parallel solution does not scale on GPU platforms. In the meanwhile, there are an increasing number of researchers investigating the ANN system on GPUs. For example, Faiss (J. Johnson, M. Douze, and H. Jégou, "Billion-scale similarity search with GPUs," arXiv preprint arXiv: 1702.08734, 2017) is a popular GPU-accelerated quantization-based ANN system. As the quantization method has low instruction dependencies, Faiss can fully parallel the execution and shows superior performance over dense data compared with other CPU-based methods. On the other hand, despite that graph-based methods provide better results on CPUs, complex graph structures and high execution dependencies of graph searching make the GPU adaptation a challenging task.

In this patent document, the parallel processing unit (such as a GPU) adaptation problem is investigated and a number of optimizations for graph-based ANN methods are presented. While references herein may be made to GPUs, it should be noted that the inventive concepts disclosed in this patent document are not limited to just GPUs but may be applied to other hardware components, such as Field Programmable Gate Arrays (FPGAs), Application-Specific Integrated Circuit (ASIC), and the like, that facilitate parallel processing such as single instruction, multiple thread type processors or single instruction, multiple data type processors.

Some of the contributions disclosed in this patent document include, but are not limited to, the following:

Embodiments of SONG (acronym of "Search ON Graph") are introduced herein—ANN search embodiments that perform graph-based ANN searching on single instruction, multiple thread type processors or single instruction, multiple data type processors, such as GPUs. To the authors' knowledge, SONG is the first graph-based ANN system designed for such processors.

Embodiments of a novel framework are disclosed herein that decouple a searching on graph method into three stages: candidates locating, bulk distance computation, and data structures maintenance to parallelize the performance-crucial distance computation. Unlike GPU Breadth-First search methods, framework embodiments herein may be optimized specifically for the graph-based ANN searching by addressing the heavy high-dimensional distance computation of ANN problems.

A combination of data structures and optimizations for GPU ANN graph searching are presented herein. In one or more embodiments, open addressing hash table, Bloom filter, Cuckoo filter, or a combination thereof may be employed to serve as a high-performance hash table. In one or more embodiments, a series of optimizations may be utilized including: bounded priority queue, selected insertion, visited deletion, or a combination thereof, to eliminate dynamic memory allocations and trade computations for less memory consumption.

Embodiments of a parameterized graph searching algorithm methodology—multi-query and multi-step probing—may be introduced in the candidate locating stage that enables fine-tuning for the performance.

Embodiments were evaluated experimentally and were compared against HNSW (a state-of-the-art ANN method on CPU platform discussed in Y. A. Malkov and D. A. Yashunin, "Efficient and Robust Approximate Nearest Neighbor Search Using Hierarchical Navigable Small World Graphs," *IEEE Transactions On Pattern Analysis And Machine Intelligence*, 2018) and Faiss (the popular GPU ANN system, which was referenced above) on six datasets. The results confirm that SONG has around 50-180× speedup compared with single-thread HNSW, while it substantially outperforms GPU-version Faiss.

B. Hardware Architecture Embodiments

In this section, a typical GPU architecture is presented, which is a foundation for the hardware-specific optimizations of SONG. As noted above, while references herein are made to GPUs, it should be noted that the inventive concepts disclosed in this patent document may be applied to other implementations that facilitate parallel processing, such as, for example, single instruction, multiple thread type processors or single instruction, multiple data type processors.

1. Hardware Architecture and Memory Hierarchy

Figure 2:
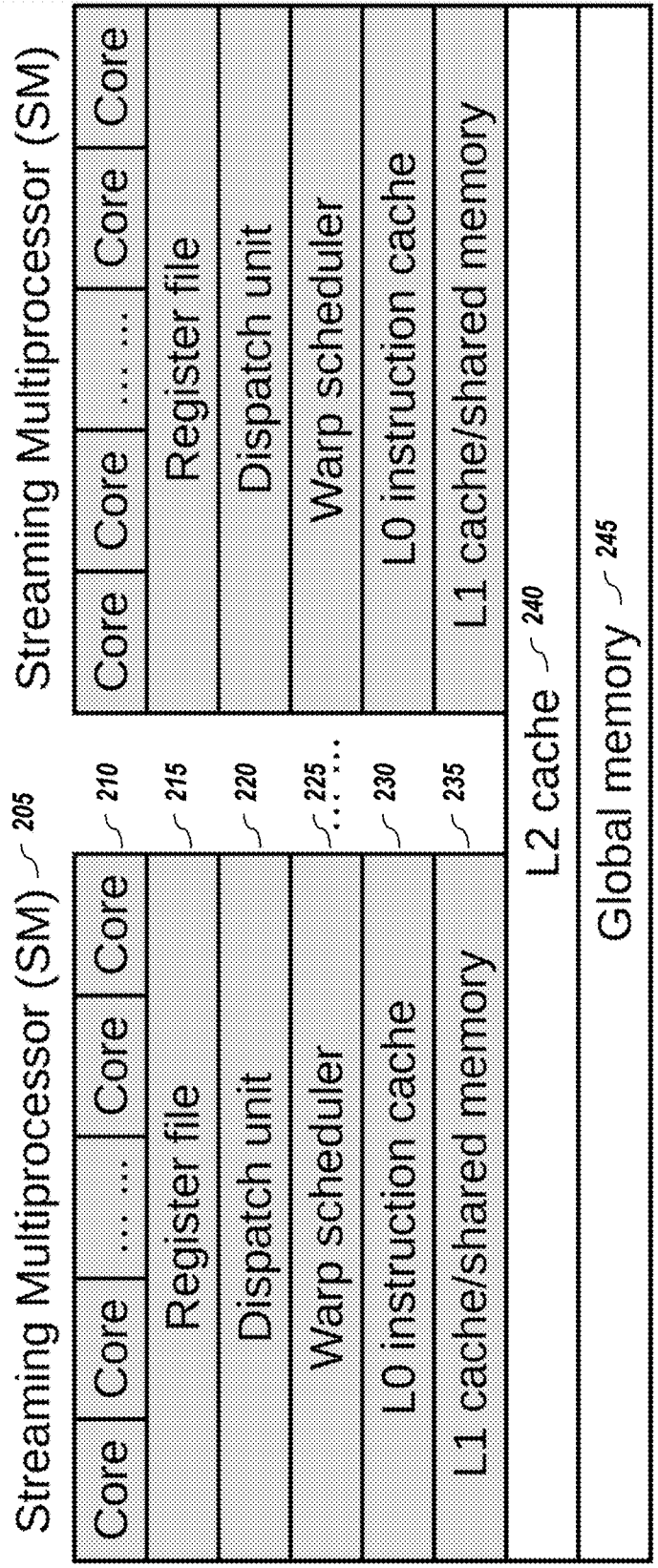
FIG. 2 illustrates a processor unit hardware architecture and memory hierarchy, according to embodiments of the present disclosure.

FIG. 2 illustrates a GPU hardware architecture and memory hierarchy, according to embodiments of the present disclosure. The GPU 200 contains multiple streaming multiprocessors (SM) 205. Each SM 205 has dozens of cores 210, two dispatch units 220, a warp scheduler 225, a register file 215, and a configurable L1 cache and shared memory 235. In the depicted embodiment, all SMs share an L2 cache 240 and a global memory 245. The cores 210 in an SM are typically targeted at a limited subset of computation instructions. In one or more embodiments, the dispatch units and the warp scheduler in the SM issue instructions and schedule execution of the cores. In one or more embodiments, register file 215 is an array of processor registers that can be directly accessed by the cores. An L0 instruction cache 230 has been introduced recently in the NVIDIA Volta architecture, by NVIDIA of Santa Clara, Calif. The L0 instruction cache 230 may be employed to provide higher efficiency than the instruction buffers used in prior GPUs. Unlike CPU platforms, the GPU L1 cache is configurable—for example, a programmer can allocate a portion of the L1 cache as shared memory. Shared memory may be manipulated explicitly and is accessible to all cores inside the same SM. All SMs may access the global memory, and the L2 cache acts as a cache for the global memory I/Os.

Global memory 245 may be accessed from all the cores across SMs. Although the largest in size, global memory has the lowest bandwidth and the highest access latency. Shared memory is a high-bandwidth and low-latency memory. It is also shared by cores within an SM. The two levels of cache L1 and L2 are leveraged to improve the global memory access latency. When global memory addresses are requested, aligned continuous addresses may be merged into a single memory transaction. Cores typically access consecutive global memory addresses to access data efficiently from global memory.

2. Programming Model

In the CUDA (Compute Unified Device Architecture) programming model, workloads are issued to the GPU in the form of a function—the function is referred as a kernel. Similar to the definition in CPU platforms, a logical instance of the kernel is called a thread. Threads may be grouped in blocks. Physically, all the threads within a block locate on the same SM. Threads may access the various units of the deep memory hierarchy explicitly in the CUDA code. To manage thousands of concurrent threads running on different parts of the data, the SM employs SIMT (single-instruction, multiple-thread) or SIMD (Single Instruction Multiple Data) parallelism by grouping consecutive threads of a block into a warp. All the threads in a warp have to perform the same instruction at a time. If-else branch in the code blocks the execution of some threads in the same warp. Threads working on different code branches are executed sequentially.

C. SONG System Embodiments Overview

In this section, some performance bottlenecks of searching are presented, and the main modules of SONG embodiments that optimize the methodology from a high-level view are also presented.

1. Distance Computation

The profiling result of the searching algorithm on CPU platforms shows that more than 95% time is spent on distance computations (e.g., Line 11 of Method 1) for most common ANN benchmark datasets—the performance is dominated by distance computations. Compared with the time-consuming high-dimensional distance computation, other operations like priority queue maintenance and memory accesses take less than 5% execution time. In contrast, GPUs are capable to efficiently parallel the high-dimensional distance computation with its large number of cores. The major 95% cost on CPUs can be significantly improved on GPUs. Although the major cost is substantially reduced, other unnoticeable problems on CPUs arise on GPUs. As opposed to the CPUs, GPU memory accesses may become a dominant factor.

2. Memory Access

The CPU graph searching method introduces dynamic memory allocations and occupies a large working memory in the searching. It tends to not be scalable on a GPU because there are many fewer available memory budgets per thread on a GPU. In order to efficiently parallel the searching, one may have to limit the memory consumption of the priority queues and the hash table in Method 1.

3. High-Level Approach

In this section, a high-level approach for solving one query in the GPU graph searching algorithm is presented. Since the major time of non-parallel approximate nearest neighbor searching on high-dimensional datasets is spent on computing distances, embodiments the hardware-centric graph searching methodology focus on exploiting the hardware unit (e.g., a GPU) to accelerate the distance computation. In one or more embodiments, to fully utilize the GPU computing bandwidth, distances are computed in a batch instead of a large number of independent pair-wise distance computation function calls. Therefore, in one or more embodiments, the distance computation part is extracted from a searching workflow by decoupling the graph searching methodology into three stages: candidates locating, bulk distance computation, and data structures updating.

Figure 3:
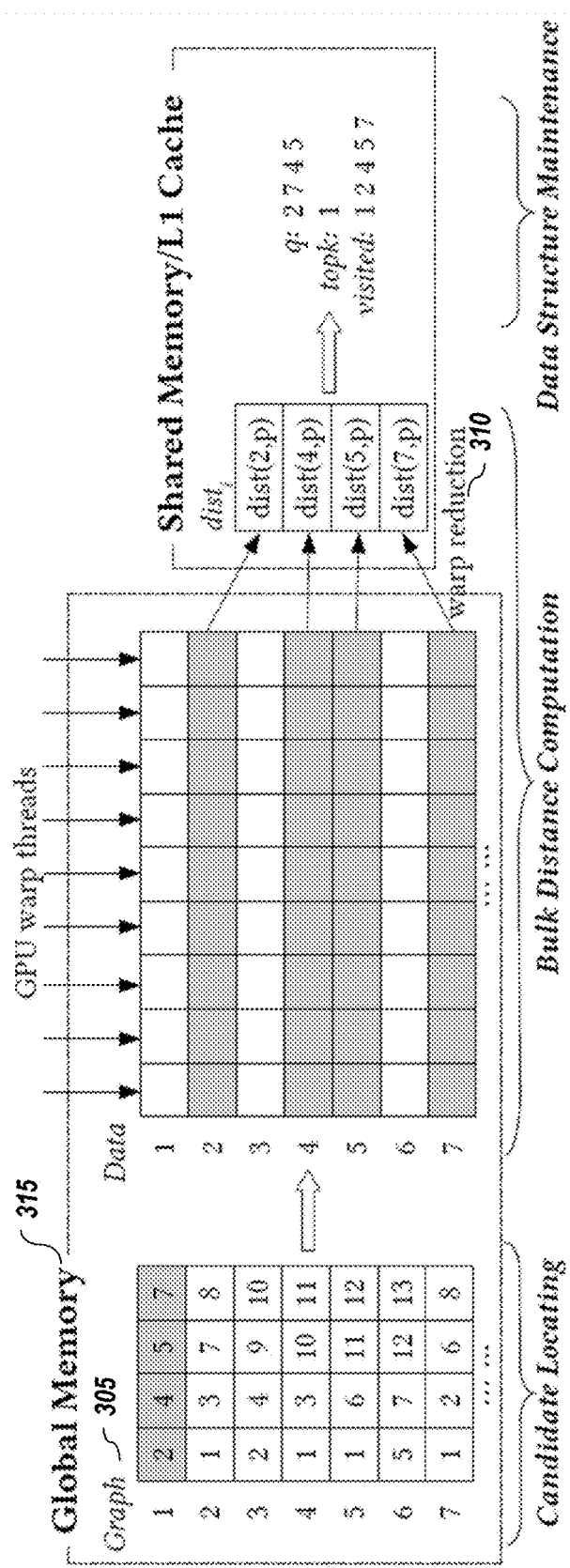
FIG. 3 illustrates a decoupled workflow, according to embodiments of the present disclosure.

FIG. 3 illustrates a decoupled workflow, according to embodiments of the present disclosure. FIG. 3 depicts an example to demonstrate a GPU warp proximity graph searching workflow embodiments, according to embodiments of the present disclosure. The graph (adjacency list) 305 on the left inherits from the example in FIG. 1. The shadowed cells represent the memory access pattern of the first iteration in FIG. 1. In the depicted example, the $i^{th}$ row stores the adjacent vertices to vertex i. For example, the first row in the graph shows that 1 connects to 2, 4, 5, and 7. As Method 1, in each iteration, a vertex is first extracted from the priority queue q to begin the search. Consider that searching is on vertex 1 in this example. The candidate locating stage fetches the vertices (2,4,5,7) that connect to 1 from the graph. Then, the bulk distance computation stage reads the vector values of these vertices from the data matrix and employs GPU warp reduction 310 to compute the distances to the query point p. The toy example in FIG. 1 is only for illustrating the idea of the searching algorithm. In real ANN applications, the dimensionality goes from a few hundred to a thousand—one can fully utilize the GPU threads in the bulk distance computation stage. After that, in one or more embodiments, the data structure maintenance stage uses the distances to update the priority queues and the hash table for the next iteration.

This 3-stage workflow decouples the distance computation and queue maintenance dependency (e.g., Method 1, line 9-15) into a batch processing pipeline. Therefore, the distance computation can be accelerated through GPUs. In one or more embodiments, these 3 stages are executed sequentially. In one or more embodiments, each stage may be optimized for the GPU architecture to achieve better performance.

D. Data Structure Maintenance Embodiments

1. Data Structures on GPU/GPU-Like Processor

In one or more embodiments, the data structures are designed specifically for the graph searching task on GPU. Embodiments of a fixed-degree graph for graph storage and hash table alternatives are presented herein.

a) Fixed-Degree Graph Storage Embodiments

The proximity graph used in graph-based ANN searching typically has the following property: the degree of each vertex is bounded by a fixed constant K. In one or more embodiments, storing the graph as an adjacency list involves keeping an index in the GPU memory that tracks the offset of each vertex. Index look-up is inefficient since it requires an additional memory operation to load the index. Storing the graph as a fixed-degree adjacency list eliminates the additional index look-up in adjacency lists. A vertex may be located by multiplying its index with the fixed size of a vertex, because each vertex takes the same fixed amount of memory. The fixed-degree graph 305 may be stored in the GPU global memory (see, e.g., FIG. 3, 315).

b) Query

While the proximity graph and the dataset can be persisted on the GPU global memory before the queries come, the query points should be transferred from the host CPU main memory to the GPU global memory at runtime. During the searching process of a query, the queried point is frequently accessed to compute the distance to other vertices in the graph. In one or more embodiments, the query point is explicitly copied into the fast on-chip shared memory (e.g., L1 cache) to reduce GPU global memory reading.

c) Concurrency Control

Although there are a few studies introducing the lock-free concurrent priority queue and hash table, those data structures are designed as a substitute for host-side CPU data structures—not for the threads in a CUDA kernel. Furthermore, only dozens of insertions are required in an iteration. The sequential operations outperform the complicated concurrent data structures. Therefore, in one or more embodiments, the priority queues and the hash tables are maintained by one single thread.

d) Memory Access Patterns

GPU shared memory can be accessed by all threads in the same block in low latency. As discussed above, in one or more embodiments, p is copied to the shared memory because p is frequently accessed in distance computations. In addition, in one or more embodiments, candidate and dist may be allocated as fixed-length arrays in the shared memory. In one or more embodiments, the lengths of candidate and dist are at most the fixed degree of the graph index. Allocating them as a fixed-length array tends to be more efficient than dynamic allocation. Putting them into the shared memory eliminates additional communication cost in the warp reduction. Because, in one or more embodiments, the priority queues and hash tables are maintained by only one thread, q, topk, and visited are allocated as the local memory of its host thread—no other threads access these data structures. In one or more embodiments, the graph index and the data are kept in the global memory.

2. Hash Table Embodiments

In this section, embodiments of the design of the hash table (visited) in the searching methodology and their alternatives are discussed.

a) Open Addressing Hash Table Embodiments

One of the most popular hash table implementations is separate chaining, e.g., the hash table (unordered_set) implementation of GNU GNU Compiler Collection (GCC) uses separate chaining to resolve the hash collision. However, the chaining solution requires dynamic memory allocation, such as linked list, which tends to destroy the GPU computation performance. In one or more embodiments, another hash collision method—open addressing—is employed in embodiments of the GPU graph searching. Open addressing probes through alternate locations in the array until either the target record is found, or an unused array slot is found. In one or more embodiments, a fixed-length array in the shared memory is allocated for each thread block. In one or more embodiments, the length is proportional to the searching parameter K and may be pre-computed. The linear probing step may be paralleled in the warp level—all threads in a warp probe the memory and locate the insertion/deletion location by a warp reduction. In one or more embodiments, the parallel probing in the warp level is limited because the linear probing does not need to probe many locations. Probing one memory location for each thread in a warp (e.g., 32 threads) is usually sufficient to find a valid insertion/deletion location.

b) Bloom Filter Embodiments

It has been observed that the visit test does not have to be answered precisely—false positives may be tolerated while false negatives may incur heavy computation overhead. False positives (visited indicates that an element has been visited but it actually has not been visited) prevent searching some unvisited vertices—some search accuracy may be lost when the skipped vertices are the only path to the queried nearest neighbor. On the other hand, false negatives (visited indicates that a vertex has not been visited but actually this vertex has been searched before) may lead to searching the visited vertices again—it introduces significant overhead when the revisited vertices are searched and inserted into the priority queue multiple times. The data integrity is also influenced, because additional checks are required to avoid inserting one vertex multiple times in the priority queue. To occupy less memory, a probabilistic data structure may be employed (such as a Bloom filter) to replace the hash table.

Bloom filter takes a constant small memory footprint that can be implemented efficiently in GPU settings. In addition, Bloom filter guarantees no false negatives, and the false negatives are theoretically constrained. Bloom filter works as a counterpart of the hash table by slightly trading-off the accuracy introduced by the false positives. In one or more embodiments, the false positive rate is related to the number of elements inserted into the Bloom filter. In practical, a Bloom filter with around 300 32-bit integers has less than 1% false positives when inserting 1,000 vertices—the accuracy loss introduced by the Bloom filter is ignorable. Suppose the key of a data point is also a 32-bit integer, the Bloom filter method takes at least 3× less memory than the hash table.

3. Optimization Embodiments

FIG. 4 depicts examples for (a) bounded priority queue, (b) selected insertion, and (c) visited deletion, according to embodiments of the present disclosure. Examples for (a) bounded priority queue; (b) selected insertion; and (c) visited deletion. In one or more embodiments, each step may be built on top of the previous optimization. For illustration, the proximity graph referred in this example is in FIG. 1.

a) Bounded Priority Queue Optimization Embodiments

In one or more embodiments, the searching algorithm (e.g., Method 1) maintains a priority queue that stores the current found top-k candidates for the query. While it may be efficient to implement the priority queue as a binary heap on CPU, straightforwardly transplanting the binary heap to the GPU is problematic, however. The binary heap implementation consumes unbounded memory—vertices are kept being added into the queue during the search—the size of q can grow much larger than K. Unbounded memory allocation can be catastrophic to GPU performance. In order to utilize GPU effectively to store q, the following observation may be made:

Observation 1: The searching on graph method (e.g., Method 1) only utilizes the first K elements in q.

Proof. After the size of q grows to K+1, denote the $(K+1)^{th}$ element in q as x. If x will not be extracted from q in future iterations, x will not be included in the top-K result. Otherwise, x will be extracted from q later. At that moment, topk has already been filled by K elements. Meanwhile, since there are at least K processed element better than the x, the condition in Method 1, line 4 is satisfied—the method exits and x is not included in the top-K result.□

Therefore, in one or more embodiments, one can pop out the worse candidate from q when its size grows to K+1. The example (a) in FIG. 4 depicts the iterations of this optimization, according to embodiments of the present disclosure. Comparing with the original methodology embodiment (e.g., FIG. 1), the bounded priority queue optimization eliminates the insertions of 5, 13, 14 and bounds q within 3 elements.

In one or more embodiments, a GPU version of symmetric min-max heap may be implemented to act as the bounded priority queue. Insertion and popping the min/max element both take logarithmic time.

b) Selected Insertion Optimization Embodiments

Since the data structure maintenance is dominated by memory bandwidth and latency, this stage may be improved when the data structures have smaller memory footprints. The memory consumption of both hash table and Bloom filter is proportional to the number of insertions. In one or more embodiments, the selected insertion optimization may be employed to reduce the insertions to visited—the memory consumption is decreased as a result.

After a vertex's distance to the query point is computed, the vertex is marked as visited in the original method embodiment (e.g., Method 1, line 12). In one or more embodiments, a selection before the insertion may be used: the vertices that have larger distances than all the K elements in the topk are filtered out—a vertex is marked as visited and pushed into q only when it is among the current top-K closest vertices to the query point.

Example (b) in FIG. 4 illustrates an example when applying the selected insertion on top of the bounded priority queue optimization in example (a) in FIG. 4, according to embodiments of the present disclosure. In the $3^{rd}$ iteration, vertex 13 and 14 are not marked as visited nor pushed into q if the selected insertion optimization is applied—because topk is fully filled with K candidates while 13 and 14 have larger distances than all the vertices in topk. In the $4^{th}$ iteration, 6 is not inserted into q nor visited because 4 is worse than all the candidates in topk. Since the filtered vertex is not marked as visited, its distance may be computed again when its neighbor is processed in the future iterations. Note that the top-K candidates (in the topk priority queue) are guaranteed to become closer and closer to the query point during iterations. Therefore, a filtered-out vertex is guaranteed to be filtered out again in future iterations. With this selected insertion optimization, the correctness and integrity of the searching method are still preserved—no vertex is inserted multiple times in the hash tables or priority queues. The selected insertion method reduces insertions and GPU memory usages at the cost of computing some distance multiple times. In this example, the final visited size is 7—it stores 3 less elements than in example (a) in FIG. 4. In one or more embodiments, the distance computation may be fully paralleled, while the hash table and priority queue maintenance may be sequential. Thus, this computation-space trade-off is able to improve query performance.

c) Visited Deletion Optimization Embodiments

In one or more embodiments, following the idea of selected insertion, one further step is taken to save more GPU memory aggressively—in order to ensure the correctness of the searching algorithm, one only needs to keep the visited as a hash table that shows whether a vertex is in the priority queues q and topk. Specifically, after a vertex is extracted from the priority q and processed, it may be deleted from visited if the vertex does not update the topk. Also, when the topk is updated, the popped-out vertex may also be deleted from the visited hash table. The intuition is similar to the selected insertion optimization: the deleted vertices (logically re-marked as unvisited) have larger distances than the current top-K candidates—they will not update the top-K candidates nor be inserted into the priority queue q in future iterations. Example (c) in FIG. 4 shows an example, according to embodiments of the present disclosure. In one or more embodiments, when applying the visited deletion optimization, the hash table visited is exactly the union of q (size at most K) and topk (size at most K). Therefore, the size of visited is bounded by 2K.

The visited deletion optimization requires the deletion operation on visited. The deletion operation of hash table may be performed in constant time. While the hash table alternative—Bloom filter—does not support deletion. In one or more embodiments, a different filter, such as a Cuckoo filter, may be selected as the hash table probabilistic data structure alternative to validate the visited deletion optimization.

Comparing with the original method embodiment in FIG. 1 and the running example (c) in FIG. 4, it can be observed that almost 50% less memory is utilized by applying embodiments of the 3 optimizations. In real applications, the searching takes hundreds of iterations—it yields more memory savings than this example.

E. Candidate Locating Embodiments

1. Basic Candidate Locating Embodiments

In the candidate locating stage, one thread in the warp (say, thread 0) is responsible to extract the vertex id that is closest to the query point, and the thread adds the current unvisited neighbor vertices into a list candidate. In FIG. 3, nodes 2, 4, 5, and 7 are located and stored in candidate for the distance computation stage. Since this stage is simple and does not involve complicated computations, one thread can handle the task efficiently.

2. Multi-query in a Warp Embodiments

In the basic candidate locating method embodiment, other threads are idle when thread 0 extracting the vertex from the priority queue. Multiple queries may be processed in a warp to improve thread utilization. For example, consider the system is processing 4 queries in a warp. Priority queues and hash tables for each query may be constructed. 4 active threads (say, e.g., threads 0, 1, 2, and 3) extract the vertex id from their corresponding q. Although there are more active threads, the disadvantage is that a separate set of data structures (priority queues and hash tables) are created for each query processed in this warp. It is not clear to choose the best number of queries in a warp. This issue is discussed in the experimental evaluations (see Section I.3.).

3. Multi-Step Probing Embodiments

Recent GPU Breadth-First Search (BFS) studies suggest a strategy that expands adjacent neighbors in parallel. In one or more embodiments of the graph searching problem herein, it corresponds to extracting multiple vertices from q instead of only the first vertex. Multi-step probing fills more vertices into the candidate list. Unlike the general BFS problem, searching on the proximity graph usually goes along the direction to the query point in a small number of steps. Therefore, the neighbors of the current processing vertex are more likely to be the head of the priority queue. The multi-step probing may waste the probing memory accesses and distance computations on suboptimal candidates. Its effectiveness is evaluated in Section I.3.

F. Bulk Distance Computation Embodiments

Next to be addressed is the issue with heady distance computations in graph-based ANN methods. In one or more embodiments, the bulk distance computation stage takes the vertices in the candidate list as input, fetches the corresponding data from the dataset, computes their distances to the query point, and outputs the results into an array in the shared memory (see, e.g., FIG. 3). In one or more embodiments, all threads in the block are involved in this stage—each thread takes charge of a subset of dimensions to compute a partial distance. In one or more embodiments, afterwards, thread 0 aggregates the partial distances of all warps into one value through a shfl_down warp reduction. The aggregated distance for the $i^{th}$ element in candidate may be stored in $dist_i$.

Instead of simply computing the distance for each candidate concurrently, the above parallel strategy embodiment is more cache-friendly. In the proposed parallel reduction, 32 threads are organized to access contiguous memory addresses. If the candidates are processed concurrently, the memory access pattern of each thread is independent—more cache misses are generated.

This parallel reduction distance computation method embodiment may be applied to common popular ANN distance measures such as p-norm distance, Cosine similarity, and inner product.

G. Out-of-GPU-Memory Datasets Embodiments

In this section, solutions to tackle out-of-GPU-memory datasets are discussed. This problem is particularly emergent for storing high-dimensional data. Often the size of the graph index is much smaller—it is proportional to the degree×#data, where degree is the degree limit of the graph index and #data is the number of data points in the dataset. Empirically, it may be sufficient to use 16 for the degree—the graph index is under 1 GB for millions of data points. For example, the 16-degree graph index size of 8 million 784-dimensional data points takes 988 MB, while the dataset size is 24 GB. For using GPU to accelerate graph searching, the dataset size should preferably be reduced to store it in the GPU. Accordingly, in one or more embodiments, one or more random hashing techniques that encode high-dimensional data into a bit vector may be employed. Then, the hashed dataset may fit in GPU memory, and distances are computed on the low-dimensional bits.

1-bit random projection. Among numerous probabilistic hashing methods, in one or more embodiments, a popular method named "1-bit random projections" is introduced. Formally, for two data vectors $u, v \in \mathbb{R}^d$, a random vector $r \in \mathbb{R}^d$ with entries in iid (independent and identically distributed) standard normal is generated. Then, $Pr(sgn(<u,r>)=sgn(<v,r>))=1-\theta(u,v)/\pi$, where $\theta(u, v)$ is the angle between u and v. If entries of r are sampled from iid cauchy instead of normal, then this collision probability is closely related to the $\chi^2$ similarity. With h independent random vectors, each data point is mapped into an h-bit vector. The hamming distance between the bit-vectors becomes a good estimate of the similarity in the original data (if h is not too small). In one or more embodiments, h may be set as a multiple of 32 so that the bit vector can be stored as several 32-bit unsigned integers. This way, the memory footprint of a bit vector equals to the space of h/32 single-precision floating values. The hashing performance for out-of-GPU-memory dataset scenario is investigated in Section I.8.

It shall be noted that other techniques, such as sharding, are also applicable to the scalability challenge. For example, when multiple GPUs are considered, one may shard the data for each GPU, build a graph index for each shard, perform graph search on each GPU, and merge the results.

H. Alternative Embodiment

Presented below is an alternative methodology for searching on a proximity graph using a batch of query points, according to embodiments of the present disclosure.

Figure 5:
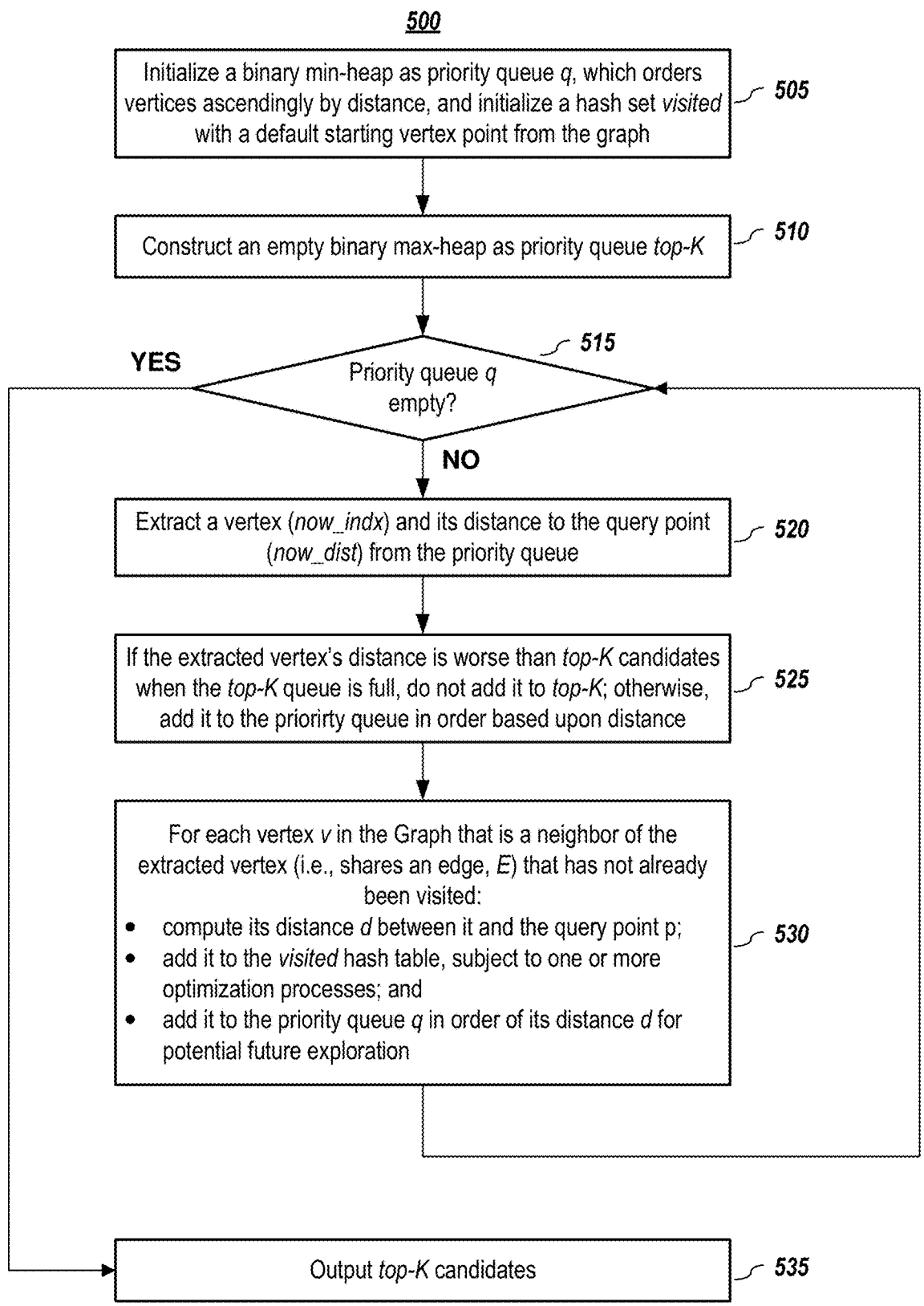
FIG. 5 depicts a search method, according to embodiments of the present disclosure.

FIG. 5 depicts a method for performing an approximate nearest neighbor search using one or more SIMT-type or SIDM-type processors, according to embodiments of the present disclosure. In one or more embodiments, given a query point and a proximity graph comprising vertices, which represent points, and edges, which represent neighbor vertices, the method includes initializing (505) a binary min-heap as a first priority queue (e.g., q), which orders vertices ascendingly by distance and a hash set (e.g., visited) with a default starting vertex from the proximity graph.

Also, in one or more embodiments, an empty binary max-heap is formed (510) as a second priority queue.

In one or more embodiments, responsive to the first priority queue not being empty, the following steps may be performed. A vertex, and its distance to the query point, may be extracted (520) from the priority queue. In one or more embodiments, if the extracted vertex's distance is worse than vertex candidates in the second priority queue (e.g., top-K) when the second priority queue is full, the extracted vertex is not added (525) to the second priority queue. However, in one or more embodiments, if the extracted vertex's distance is not worse than at least one vertex candidate in the second priority queue or if the second priority queue is not full, the extracted vertex is added (525) to the second prior queue based upon its distance to the query point.

In one or more embodiments, for each vertex in the proximity graph that is a neighbor of the extracted vertex and the neighbor vertex has not already been visited, then the following steps may be performed. In one or more embodiments, the vertex's distance to the query point is computed (530). As noted above, in one or more embodiments, the vertex's distance may be computed in a batch with other distance calculations using bulk distance computation and warp reduction to efficiently utilize the processor. In one or more embodiments, a bulk distance computation comprises computing the distance for each vertex of a plurality of vertices using a plurality of threads of the processor, in which each thread uses a subset of dimensions of a vertex to compute a partial distance and a thread of the processor aggregates the partial distances into a distance value for each vertex of the plurality of vertices via warp reduction.

In one or more embodiments, subject to one or more optimization processes, the vertex is added (530) to the hash set, and subject to one or more optimization processes, the vertex is added to the first priority queue in order of its distance to the query point. Example of optimization processes include a bounded memory process, a selected insertion process, and a visited deletion process—each of which was discussed above.

In one or more embodiments, if the first priority queue is empty, the overall process stops and the second priority queue comprising one or more vertices as nearest neighbors or approximate nearest neighbors in the proximity graph to the query point may be output (535).

As noted above, additional steps may be taken to improve the computation efficiency of the processor. For example, in one or more embodiments, at least a portion of the proximity graph may be stored as a fixed-degree adjacency to eliminate use of an additional index look-up, and a vertex may be located by multiplying its index with a fixed size of a vertex. Also, in one or more embodiments, the query point may be copied into an on-chip shared memory to reduce processor global memory reading. Furthermore, in one or more embodiments, the first and second priority queues and the hash table may be maintained by a single thread.

As noted previously, the query processing may be performed in a batch. An example batch processing embodiment is depicted below with Method 2.

| Method 2 Embodiment |
| --- |
| Input: Graph index G(V, E); a batch of queries $\{p_1, p_2, ..., p_B\}$; number of output candidates K |
| Output: Top K candidates for each query topk |
| 1. For each query: Initialize a binary min-heap as priority queue $q_i$ and a hash set visited$_i$ with the default starting point. Construct an empty binary max-heap as priority queue topk$_i$ |
| 2. while all queries in the batch are not finished do |
| 3.     for unfinished query vector $p_i \in$ batch do |
| 4.         (now_dist, now_idx) ← $q_i$.pop_min( ) |
| 5.         if topk$_i$.size=K and topk$_i$.peek_max( )<now_dist then |
| 6.             set query i as finished |
| 7.             break |
| 8.         else |
| 9.             topk$_i$.push_heap((now_dist, now_idx))<now_dist then |
| 10.        end if |
| 11.     end for |
| 12.     for unfinished query vector $p_i \in$ batch do |
| 13.         candidate$_i$ ← ∅ |
| 14.         for each (now_idx, v) ∈ E do |
| 15.             if visited$_i$.exist(v) ≠ true then |
| 16.                 candidate$_i$ ← candidate$_i$ ∪ {v} |
| 17.             end if |
| 18.         end for |
| 19.     end for |
| 20.     for unfinished query vector $p_i \in$ batch do |
| 21.         for each v ∈ candidate$_i$ do |
| 22.             $d_{i,v}$ ← dist($p_i$, v) |
| 23.         end for |
| 24.     end for |
| 25.     for unfinished query vector $p_i \in$ batch do |
| 26.         for each v ∈ candidate$_i$ do |
| 27.             visited$_i$.insert(v) |
| 28.             $q_i$.push_heap(($d_{i,v}$, v)) |
| 29.         end for |
| 30.     end for |
| 31. end while |
| 32. return $\{topk_1, topk_2, ..., topk_B\}$; |

Note that, for the batch version embodiment depicted in Methodology 2, lines 12-19 relate to a candidate locating embodiment, lines 20-24 relate to a bulk distance computation embodiment, and the remaining lines between lines 2-31 relate to data structure maintenance embodiment.

Figure 6:
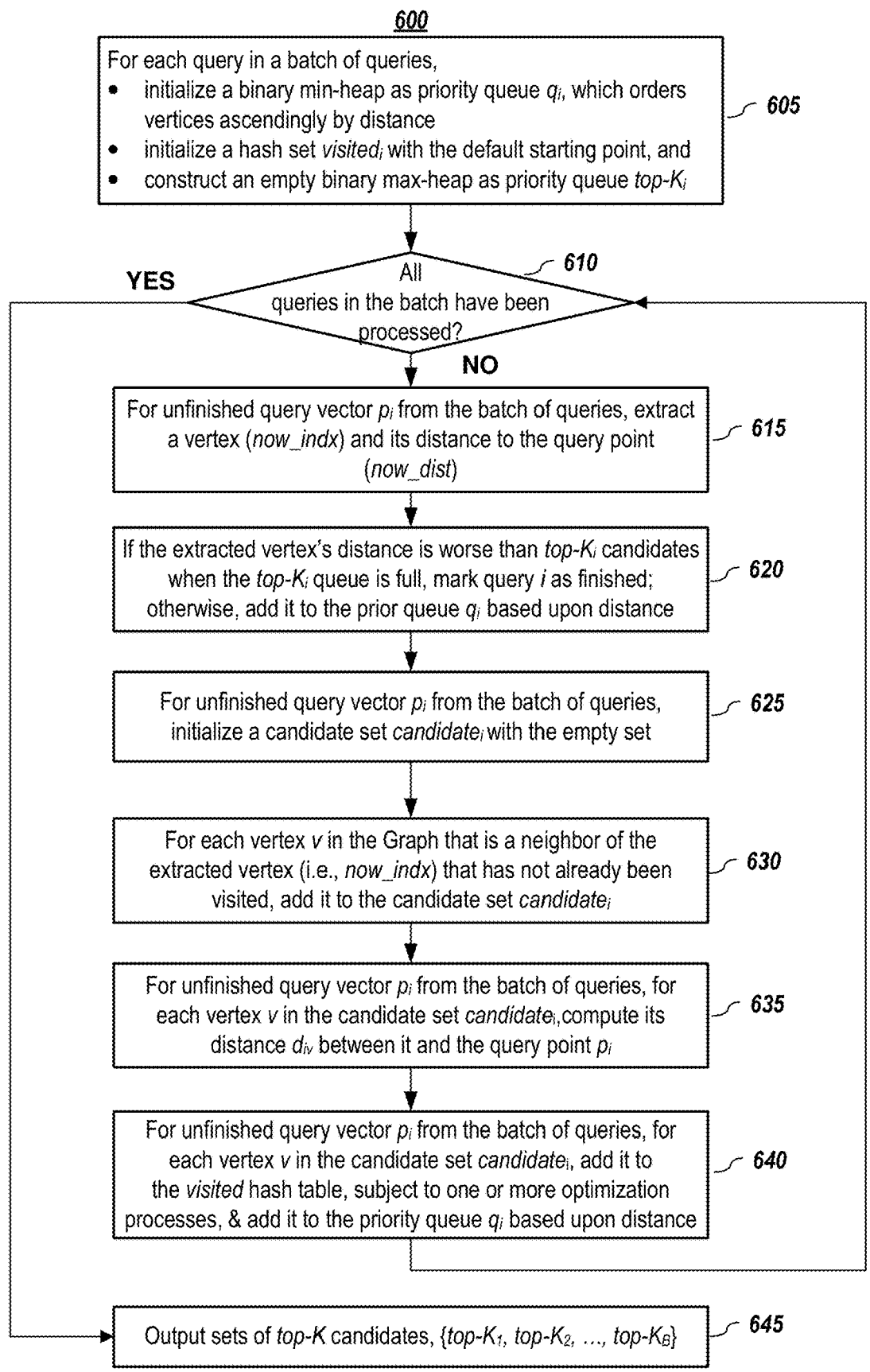
FIG. 6 depicts an alternative search method, according to embodiments of the present disclosure.

FIG. 6 depicts an alternative method for performing an approximate nearest neighbor search using one or more SIMT-type or SIDM-type processors, according to embodiments of the present disclosure.

In one or more embodiments, given a batch of query points and a proximity graph comprising vertices, which represent points, and edges, which represent neighbor vertices, the method includes, for each query in the batch, the following steps. In one or more embodiments, a binary min-heap is initialized (605) with a default starting vertex point as a first priority queue, which orders vertices ascendingly by distance, and a hash set is also initialized with the default starting vertex from the proximity graph. Also, in one or more embodiments, an empty binary max-heap is formed (605) as a second priority queue.

While all of the queries in the batch have not been finished processing, the following steps may be performed.

In one or more embodiments, for a query point from the batch of query points that has not finished processing, a vertex and its distance to the query point is extracted (615) from the first priority queue corresponding to the query point. If the extracted vertex's distance is worse than all vertex candidates in the second priority queue when the second priority queue is full, in one or more embodiments, the extracted vertex is not added (620) to the second priority queue and the query point is marked as being finished. However, in one or more embodiments, if the extracted vertex's distance is not worse than at least one vertex candidate in the second priority queue or if to the second priority queue is not full, the extracted vertex is added (620) to the second prior queue based upon its distance to the query point.

In one or more embodiments, for a query point from the batch of query points that has not finished processing, a candidate set corresponding to the query point is initialized (625) with the empty set. In one or more embodiments, for each vertex in the proximity graph that is a neighbor of the extracted vertex that has not already been visited, the unvisited neighboring vertex is added (630) to the candidate set. For each vertex that is a member of the candidate set, in one or more embodiments, the vertex's distance to the query point is computed (635). In one or more embodiments, computing the vertex's distance to the query point is performed using a bulk distance computation in which the distance for each vertex of a plurality of vertices from the candidate set is computed using a plurality of threads of the processor, in which each thread uses a subset of dimensions of a vertex to compute a partial distance, and a thread of the processor aggregates the partial distances into a distance value for each vertex of the plurality of vertices via warp reduction.

In one or more embodiments, for each unfinished query vector, for each vertex that is a member of the candidate set, in one or more embodiments, the vertex is added (640) to the hash set subject to one or more optimization processes, and subject to one or more optimization processes, the vertex is added to the first priority queue in order of its distance to the query point. Example of optimization processes include a bounded memory process, a selected insertion process, and a visited deletion process—each of which was discussed above.

In one or more embodiments, if all of the query points in the batch having finished processing, for each query point in the batch, its second priority queue comprising one or more vertices as nearest neighbors or approximate nearest neighbors in the proximity graph to the query point are output (645).

As with embodiments discussed above, one or more additional optimizations and/or techniques may be employed to enhance efficient computation on the processor or processors.

I. Experiments

In this section, a detailed investigation is provided on six datasets to analyze the effectiveness of embodiments. It shall be noted that these experiments and results are provided by way of illustration and were performed under specific conditions using a specific embodiment or embodiments; accordingly, neither these experiments nor their results shall be used to limit the scope of the disclosure of the current patent document.

Implementation. A SONG embodiment was implemented as a C++ 11 prototype. The code is compiled with g++-6.4.0 enabling the "O3" optimization. The GPU CUDA code is complied with nvcc from the CUDA 10.0 that enables "-Xptxas -O3" optimization. The SONG embodiment loads pre-built graph index generated by NSW (Y. Malkov, A. Ponomarenko, A. Logvinov, and V. Krylov, "Approximate Nearest Neighbor Algorithm Based on Navigable Small World Graphs," *Information Systems*, 45:61-68, 2014). NSW was chosen since it is a general and flexible proximity graph construction algorithm. Other alternative graph construction algorithms are also adaptable to embodiments of the acceleration framework disclosed herein.

Hardware System. The experiments were executed on a single node server. The server had one Intel Xeon Processor E5-2660 (64 bit)—8 cores 16 threads—and 128 GB of memory. Ubuntu 16.04.4 LTS 64-bit was the operating system. The GPU used on the server was NVIDIA TESLA V100.

GPU Memory Hierarchy. The GPU L1 cache is configurable: one can allocate a portion of the L1 cache as shared memory. The L1 cache has lower latency and higher bandwidth than the GPU global memory. Meanwhile, the L1 cache capacity is limited: 96 KB per SM. We allocated shared memory from the L1 cache for the heaps that store the searching candidates and the top-k results, the working query point, and the bulk computed distances. These data structures were frequently accessed during the graph searching algorithm. Moreover, their sizes were bounded and fit in the L1 cache. The visited hash table was not bounded when we did not apply any proposed optimization. Since its size can grow beyond the L1 cache capacity, it was put in the global memory. With our proposed selected insertion and visited deletion optimization, the hash table size was bounded by the searching parameter K so that it can be stored in the shared memory to accelerate the hash table probing and updating. The dataset and the graph index cannot fit in the L1 cache, thus, they were stored in the global memory.

Compared methodologies. The compared methodologies are HNSW—the state-of-the-art ANN method on CPUs, and Faiss—the top GPU ANN system for large scale data. Other studies have shown that other types of methods, such as tree-based, hashing-based approaches, have inferior performance. They were not included as competitors herein. The code of Faiss and HNSW from their GitHub repositories were used. Especially, there are multiple implementations of HNSW, the implementation from NMSLIB (the one with the best performance in ANN Benchmark) was used. To make a fair comparison, parameters of HNSW and Faiss were varied over a fine grid. Then their best results were considered.

Methodology. The index of each algorithm was pre-built. The index construction time was not included in the experiments. Especially, the SONG embodiment did not generate its own index. Instead, the same graph index as NSW (similar to HNSW but no hierarchical structures) was used for SONG. HNSW was run with one single thread: since HNSW supports inter-query parallel, the performance of HNSW can be assumed to be linearly scalable to the number of threads. For Faiss and the SONG embodiment, the queries were executed in one batch on one single GPU. Similar to HNSW, Faiss and the SONG embodiment can also linearly scale with multiple GPU cards. Comparing with the single-threaded HNSW gives a factor that shows how many CPU threads can be replaced with one GPU. The performance was evaluated by searching time (Query Per Second) and retrieval quality (recall).

Searching Time. The wall-clock time of each algorithm was measured and the number of answered Query Per Second (throughput) is presented as the execution time measurement. Query Per Second was chosen as the metric instead of the execution time of a query batch, because Query Per Second can be compared without normalizing query batch to the same size. All experiments are performed at least 3 times. The average value is reported as the result.

Retrieval Quality. Recall is a widely-used retrieval quality measurement for ANN algorithms. Suppose the candidate point set returned by a method is A, and the correct K nearest neighbor set of the query is B, then the recall is defined as:

$$\text{Recall}(A) = \frac{|A \cap B|}{|B|}.$$

A higher recall corresponds to a better approximation to the correct nearest neighbor result.

Data. Six ANN datasets were used for experiments. The specification of the datasets are shown in Table 1. The dimensions of the test datasets vary from 128 to 960, while the number of data points ranges from approximately 290,000 to approximately 8,000,000. Dataset F is the largest dataset (24 GB) and Dataset A is the smallest (301 MB). The distribution of the datasets also diverges—Dataset A and Dataset C are heavily skewed while Dataset B, Dataset D, Dataset E, and Dataset F have less skewness. Dataset F was used for the study on out-of-GPU-memory scenarios. The number of queries in the original Dataset E was 1,000; in order to eliminate the difference of query batch size with other datasets, the Dataset E queries were duplicated 9 more times to scale the queries to 10,000.

TABLE 1

Specifications of the datasets.

| Dataset | Dim | #Data | #Query | Size in HDF5 |
|---|---|---|---|---|
| A | 256 | ~290,00 | 10,000 | 301 MB |
| B | 128 | ~1,000,000 | 10,000 | 501 MB |
| C | 200 | ~1,200,00 | 10,000 | 918 MB |
| D | 256 | ~3,300,000 | 10,000 | 3.2 GB |
| E | 960 | ~1,000,000 | 10,000 | 3.6 GB |
| F | 784 | ~8,000,000 | 10,000 | 24 GB |

1. ANN Search Performance Comparisons

Figure 7A:
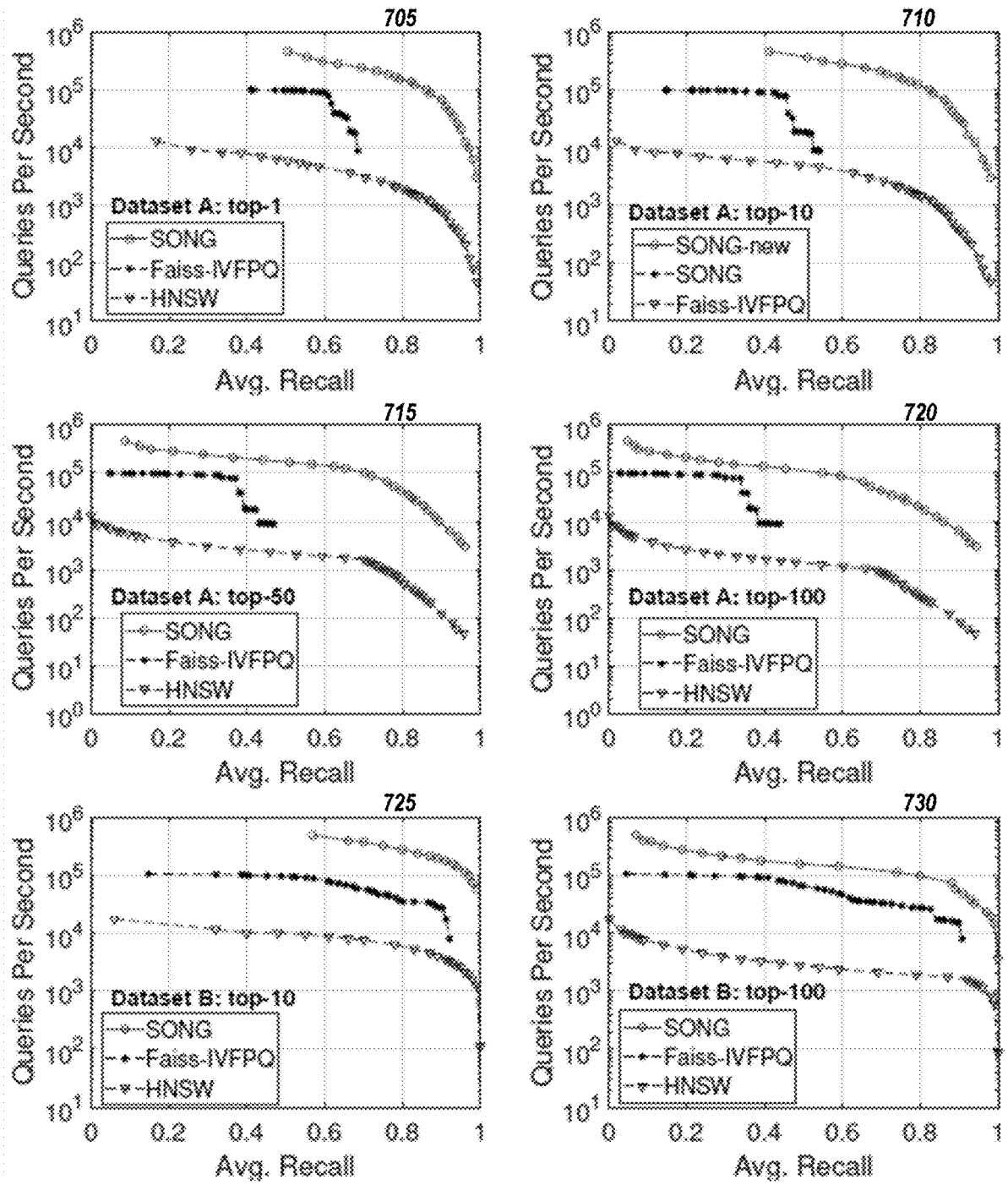
FIGS. 7A & 7B depict performance comparison of a SONG embodiment, Faiss, and HNSW on test datasets, according to embodiments of the present disclosure.
Figure 7B:
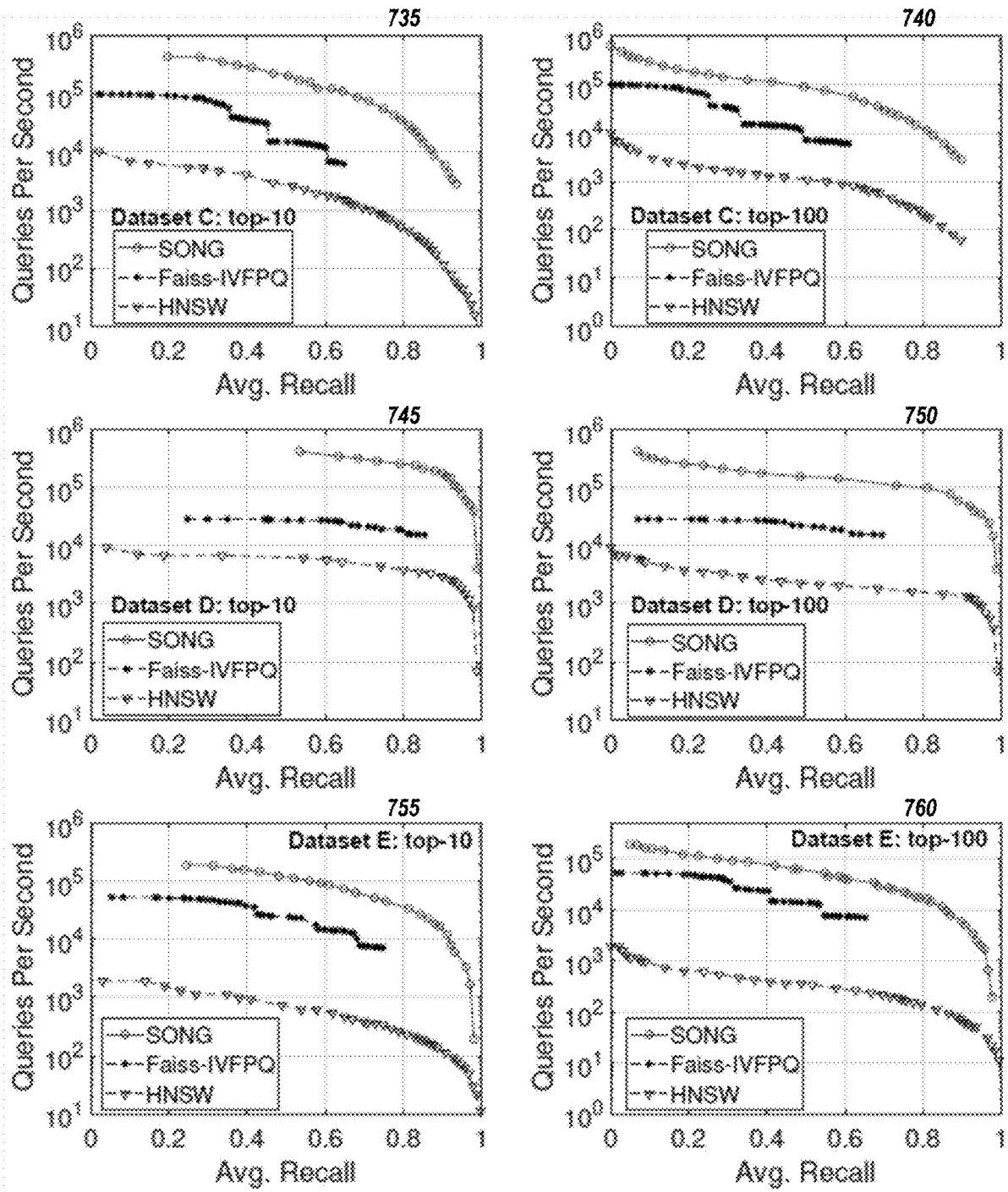
Figure 8:
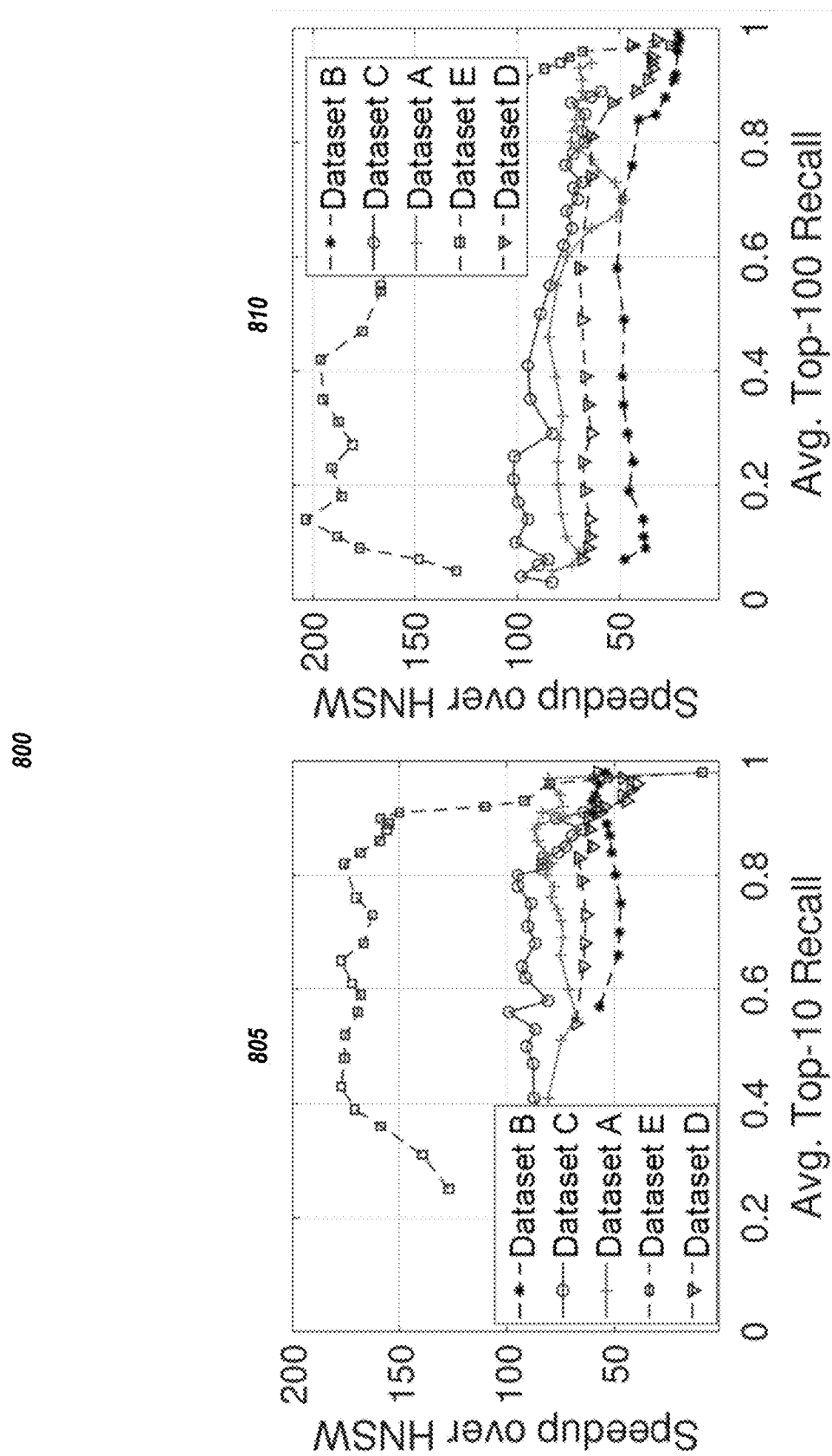
FIG. 8 depicts the SONG speedup over HNSW for average top-10 recall (805) and average top-100 recall (810), according to embodiments of the present disclosure.

ANN performance comparison results of the SONG embodiment, Faiss, and HNSW are shown in FIGS. 7A & 7B. The results for top-1 (705), 10 (710), 50 (715), and 100 (720) are shown for Dataset A. The top-10 (725) and 100 (730) are shown for Dataset B. The top-10 (735) and 100 (740) are shown for Dataset C. The top-10 (745) and 100 (750) are shown for Dataset D. And, the top-10 (755) and 100 (760) are shown for Dataset E. The Y-axis (Queries Per Second, or QPS) is in logarithmic scale. In each figure, curves closer to top-right are better. Table 2 presents the detailed results of the speedup over Faiss.

TABLE 2

Speedup over Faiss from the moderate recall (0.5) to the high recall (0.95) for top-10. The N/A means Faiss cannot reach the given recall. It is consistent with previous studies. The top-1 speedup is omitted. It has a similar trend and slightly better speedup in general.

|  | 0.5 | 0.6 | 0.7 | 0.8 | 0.9 | 0.95 |
|---|---|---|---|---|---|---|
| Dataset B | 5.9 | 5.6 | 6.6 | 7.8 | 6.8 | N/A |
| Dataset C | 14.0 | 10.7 | N/A | N/A | N/A | N/A |
| Dataset A | 20.2 | N/A | N/A | N/A | N/A | N/A |
| Dataset E | 4.8 | 6.2 | 7.7 | N/A | N/A | N/A |
| Dataset D | 16.4 | 13.7 | 14.2 | 14.2 | N/A | N/A |

As shown in Table 2, the SONG embodiment is 4.8-20.2 times faster than Faiss at the same recall. Besides, Faiss cannot reach high recalls for Dataset C, Dataset A and Dataset E. Compared with single-thread HNSW, the SONG embodiment is around 50-180× faster—it implies the SONG embodiment accelerated by 1-GPU can obtain about 3-11× speedup over HNSW on a 16-thread CPU server.

ANN searching on Dataset A and Dataset C is difficult—the data points are skewed and clustered. Faiss has a competitive performance with the SONG embodiment in the low recall ranges (recall <60%). As a quantization-based method, Faiss is limited by the quality of its generated quantization code. For Dataset A and Dataset C, the Query Per Second drops dramatically at higher recalls. With increasing the size of searching priority queues, the SONG embodiment can achieve more than 95% recall. Meanwhile, the SONG embodiment performs around 100 times better than HNSW when the recall is around 80%. Dataset B and Dataset D are "friendly" to the ANN searching—because of the un-clustered distribution of the dataset, ANN methods can quickly locate the neighboring points of a query point. The SONG embodiment achieves 99% recall with a priority queue size around 100 on Dataset B. Dataset E has the largest number of dimensions (i.e., 960) among these 5 datasets. Faiss has a closer gap to the SONG embodiment because the quantization method of Faiss encodes the high dimensional data into codes in a much shorter length. Thus, Faiss is required to perform fewer computations. Despite this, the SONG embodiment still outperforms Faiss owing to its massively paralleled distance computation. In most recall ranges, the SONG embodiment is about 180 times faster than HNSW.

Top-K nearest neighbors. The trends of the compared methods are consistent when K increases—the lines in the figure shifts to the left. Intuitively, finding 99% of top-1 is easier than obtaining 99% of the correct candidates of all top-10 data points. By exploring the same searching space, the recall drops when the problem becomes more difficult.

Index memory size. Table 3 presents the index memory size comparison. Due to the complex structure of the graph, the graph index of the SONG embodiment consumes more memory than the inverted index of Faiss. This (relatively small) difference is acceptable for the GPU memory capacity.

TABLE 3

Index memory size.

| | Dataset B | Dataset C | Dataset A | Dataset E | Dataset D |
|---|---|---|---|---|---|
| SONG | 123 MB | 145 MB | 36 MB | 123 MB | 403 MB |
| Faiss | 32 MB | 38 MB | 10 MB | 32 MB | 106 MB |

Speedup over HNSW. The SONG speedup ratio to HNSW is depicted in FIG. 6 for the top-10 and top-100 results. For Dataset B and Dataset C, the speedup ranges from 50 to 100 for most recall values. Dataset A is an interesting case: with optimizations embodiments that let the SONG embodiment use less memory, the Query Per Second of the SONG embodiment drops slower than HNSW in Dataset A dataset and thus the speedup of the SONG embodiment keeps increasing when having larger recalls. The speedup of Dataset E is more significant than Dataset B and Dataset C because Dataset E has more dimensions—the SONG embodiment has more chances to parallel the distance computations.

2. Selected Insertion and Visited Deletion Optimizations

Figure 9:
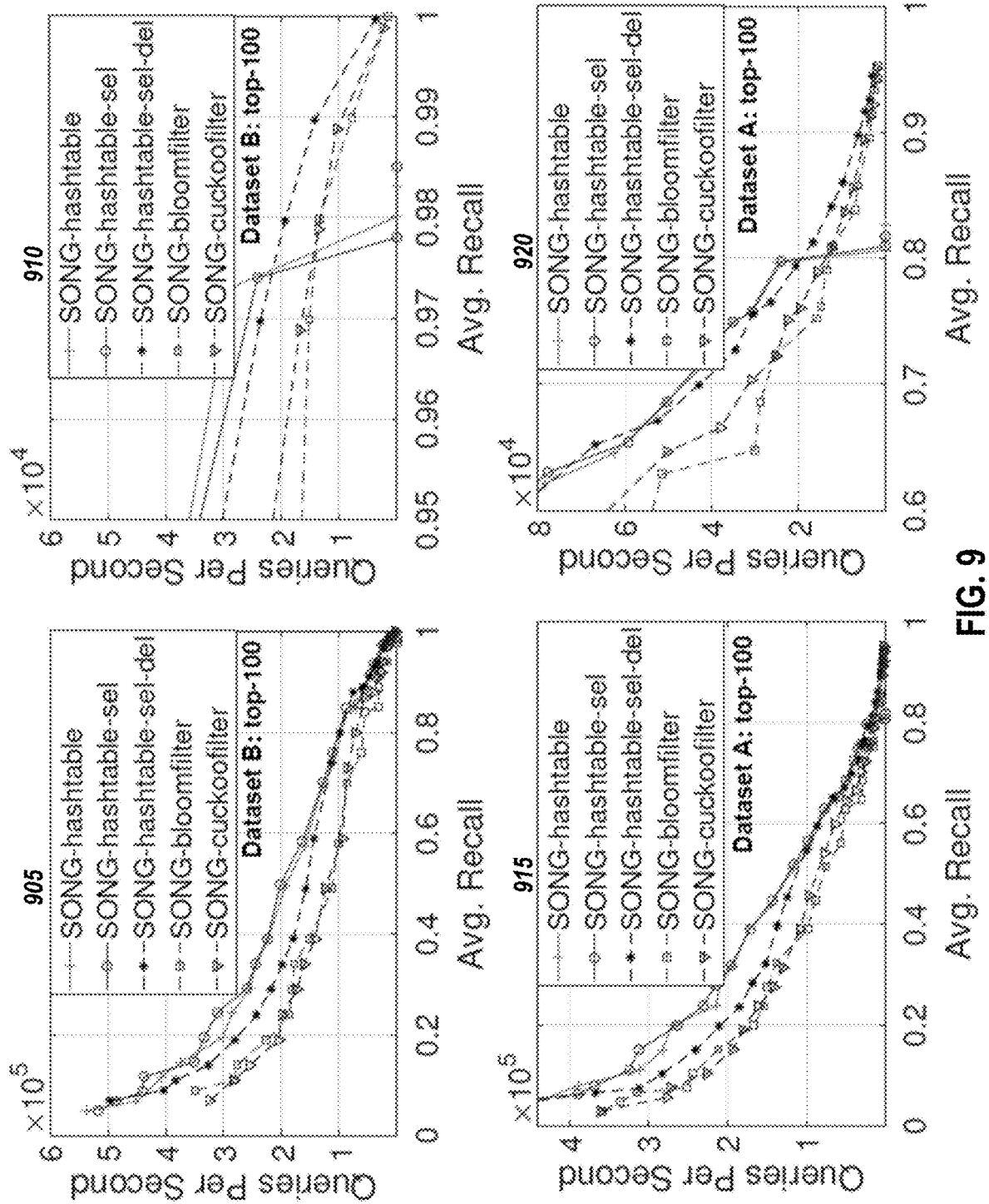
FIG. 9 depicts performance comparison for multiple hash table alternative embodiments at top-100 on Datasets A (915 and 920) and B (905 and 910), according to embodiments of the present disclosure. The right column (910 and 920) is the zoomed-in view of the first column (905 and 915).

FIG. 9 depicts the behaviors of the proposed selected insertion and visited deletion optimizations over the hash table and its alternatives, according to embodiments of the present disclosure. The performance among embodiments—the basic hash table (SONG-hashtable), hash table with selected insertion (SONG-hashtable-sel), hash table with both selected insertion and visited deletion (SONG-hashtable-sel-del), and two probabilistic data structure alternatives (SONG-bloomfilter and SONG-cuckoofilter)—were compared.

For Dataset B, the hash table enabled both selected insertion and visited deletion optimizations has the best performance. Selected insertion does not make a significant difference from the basic hash table solution, because only a small priority queue size is required to achieve high recall in Dataset B. The visited deletion optimization works well in Dataset B. The Bloom filter and Cuckoo filter solution reside between basic hashtable and hashtable-sel-del. Although they are inferior to hashtable-sel-del, they consume less GPU memory—both of them can be an alternative solution when we are short-hand of GPU memory.

When the data distribution is "unfriendly" in Dataset A, the priority queue size was enlarged to a few thousand to obtain high recalls. Similar trends were observed. In addition, because of the overhead of hash table deletion operations, hashtable-sel outperforms others in the beginning. However, it runs out of memory after the recall reaches around 81%—its performance drops dramatically. At the same time, hashtable-sel-del uses much less memory. Therefore, hashtable-sel-del becomes the fastest solution among other methods. The two probabilistic data structures have competitive performance in the high recall region because they consume less memory.

3. Searching Parameter

The effectiveness of multiple searching parameters of the candidate locating stage was investigated in this section. One searching parameter was varied, setting other parameters as 1 and fixing the hash table alternative as hashtable-sel-del. Only a subset of the experiment results is included herein because the omitted experiments have similar trends.

Figure 10:
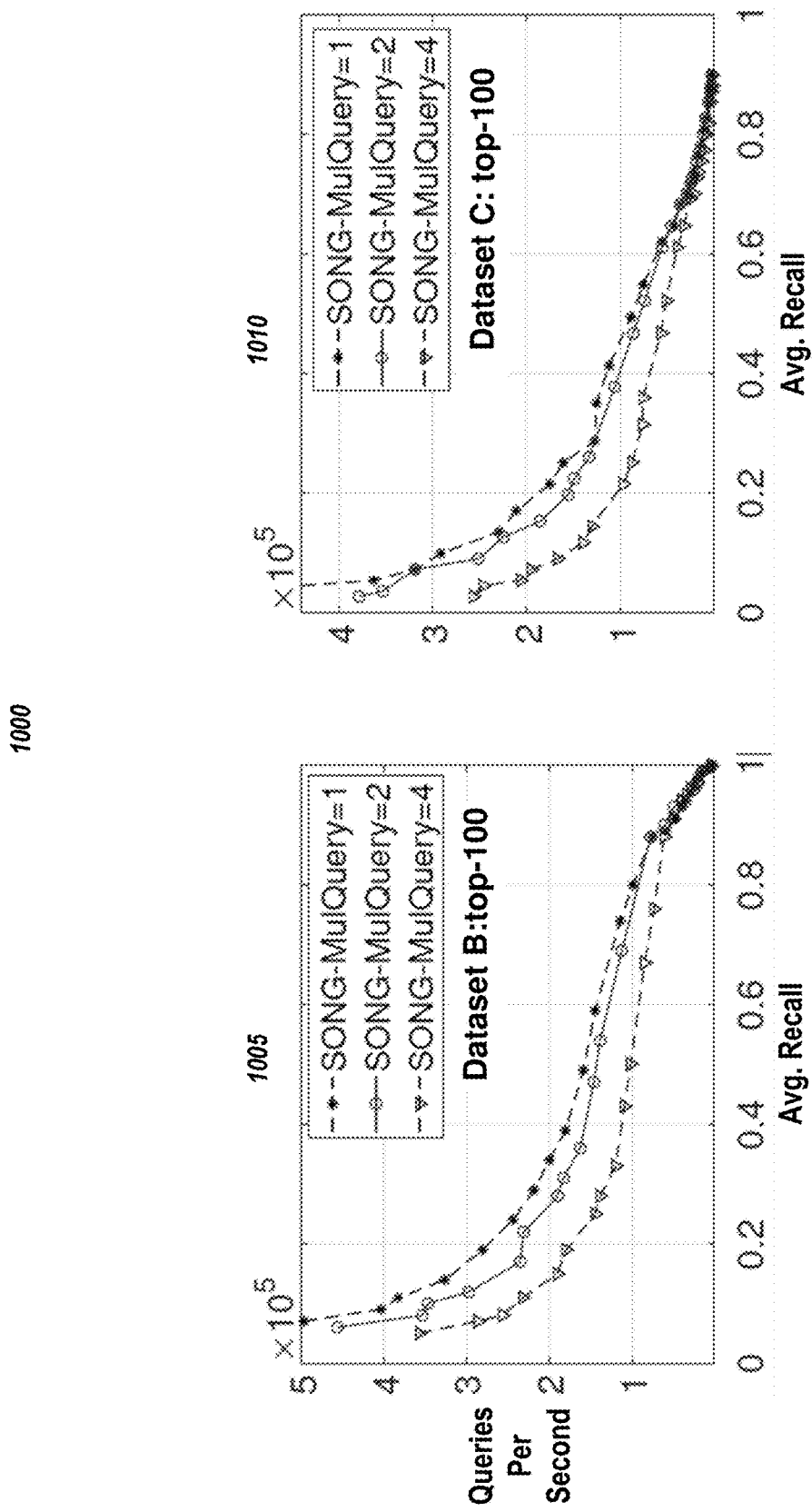
FIG. 10 depicts the effect of multi-query in a warp on two datasets (Dataset B 1005 and Dataset C 1010), according to embodiments of the present disclosure.

Multi-query in a warp. As depicted in FIG. 10, the number of queries in a warp were varied among 1, 2, and 4. Although the number of active threads increases when more queries are processed in a warp, the query performance went down. The major time spent in the candidate locating stage was to load the graph data from the global memory—it is bounded by the memory instead of the computation. Therefore, having more active threads may not improve performance. Accessing multiple parts of the graph makes the memory access pattern more unpredictable. Meanwhile, processing multiple queries in a warp also constructs multiple copies of priority queues and hash tables—it consumes more GPU memory. Thus, inferior performance was observed when solving multi-queries in a warp.

Figure 11:
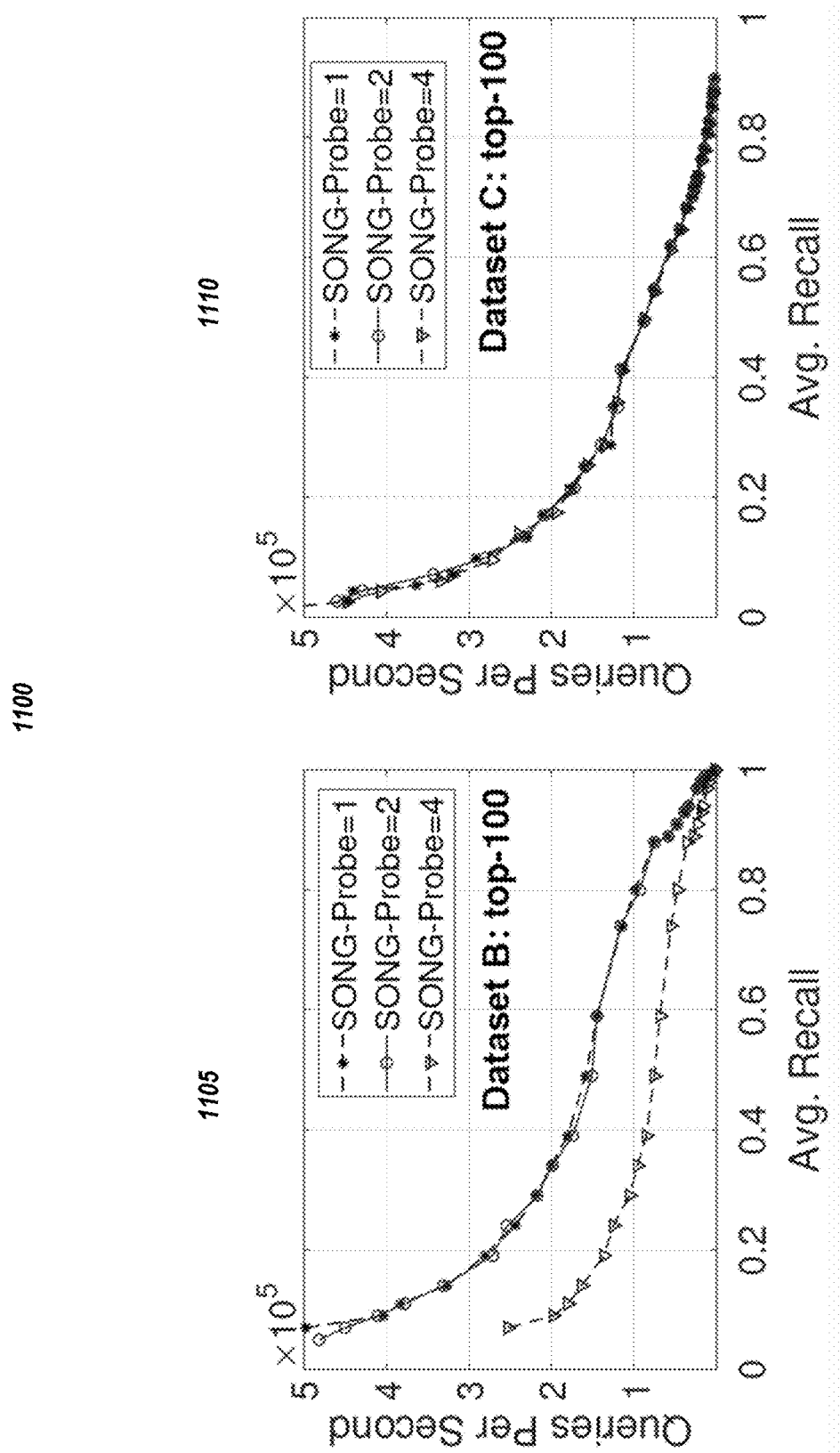
FIG. 11 depicts the effect of multi-step probing, according to embodiments of the present disclosure.

Multi-step probing. The effect of multi-step probing is presented in FIG. 11 for two datasets (1105 and 1110). As a common parallel solution in GPU BFS, multi-step probing does not improve the performance in ANN graph searching. A reason is that the neighbors of the current processing vertex are likely to be the head of the priority queue. The multi-step probing wastes the probing memory access and distance computations on unrelated candidates. In high recall ranges, the performance gap is much smaller because a lot of steps have to be probed to find very accurate nearest neighbor candidates—in this case, multi-step probing does not waste the operations.

4. Time Distribution

Figure 12:
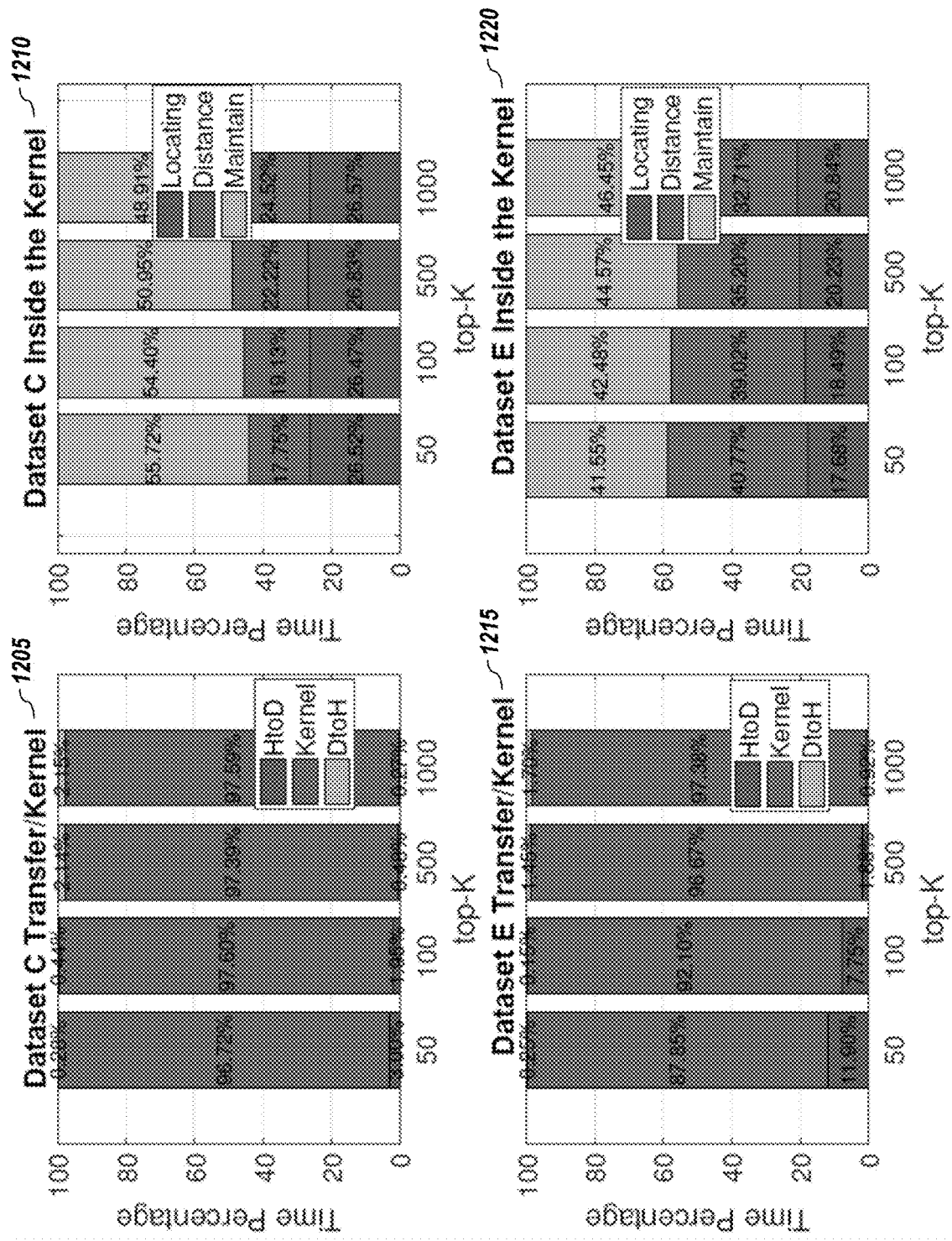
FIG. 12 depicts time distributions for GPU memory transfer/kernel execution and for each stage inside a kernel, according to embodiments of the present disclosure.

The time percentage consumed by each component on Dataset C and Dataset E were analyzed and the results presented in FIG. 12. Note that the bar charts are stacked in reverse order to the corresponding legend.

Data transfer overhead. In order to use a GPU to process queries, the query data was transferred from the CPU memory (host) to the GPU card (device). After the queries were completed on the GPU, the results stored on GPU were copied back to the CPU memory. These two memory transfers are referred to as HtoD and DtoH, respectively. The left part (1205 and 1215) of FIG. 12 shows the time distribution of data transfers and kernel execution. It can be observed that the kernel execution takes the major execution time (more than 96% on Dataset C and more than 89% on Dataset E). Since the HtoD memory transfer costs a constant time, the percentage HtoD takes decreases when the kernel execution becomes more time-consuming—larger priority queue size is used. On the other hand, more candidates are returned when a larger K was set. Thus, the DtoH time percentage slightly increases.

Time distribution over 3 stages. The right part (1210 and 1220) of FIG. 12 depicts the time distribution of candidate locating, bulk distance computation, and data structure maintenance. For both Dataset C and Dataset E, data structure maintenance takes the major execution time. Since Dataset C has 200 dimensions and Dataset E has 960 dimensions, the distance computation on Dataset E takes 8%-20% more time than the one on Dataset C. However, the maintenance time occupies a larger ratio on Dataset E. The selected insertion filters more vertices on Dataset C—more distance computations are required to save the GPU memory and data structure maintenance cost.

5. Query Batch Size

Figure 13:
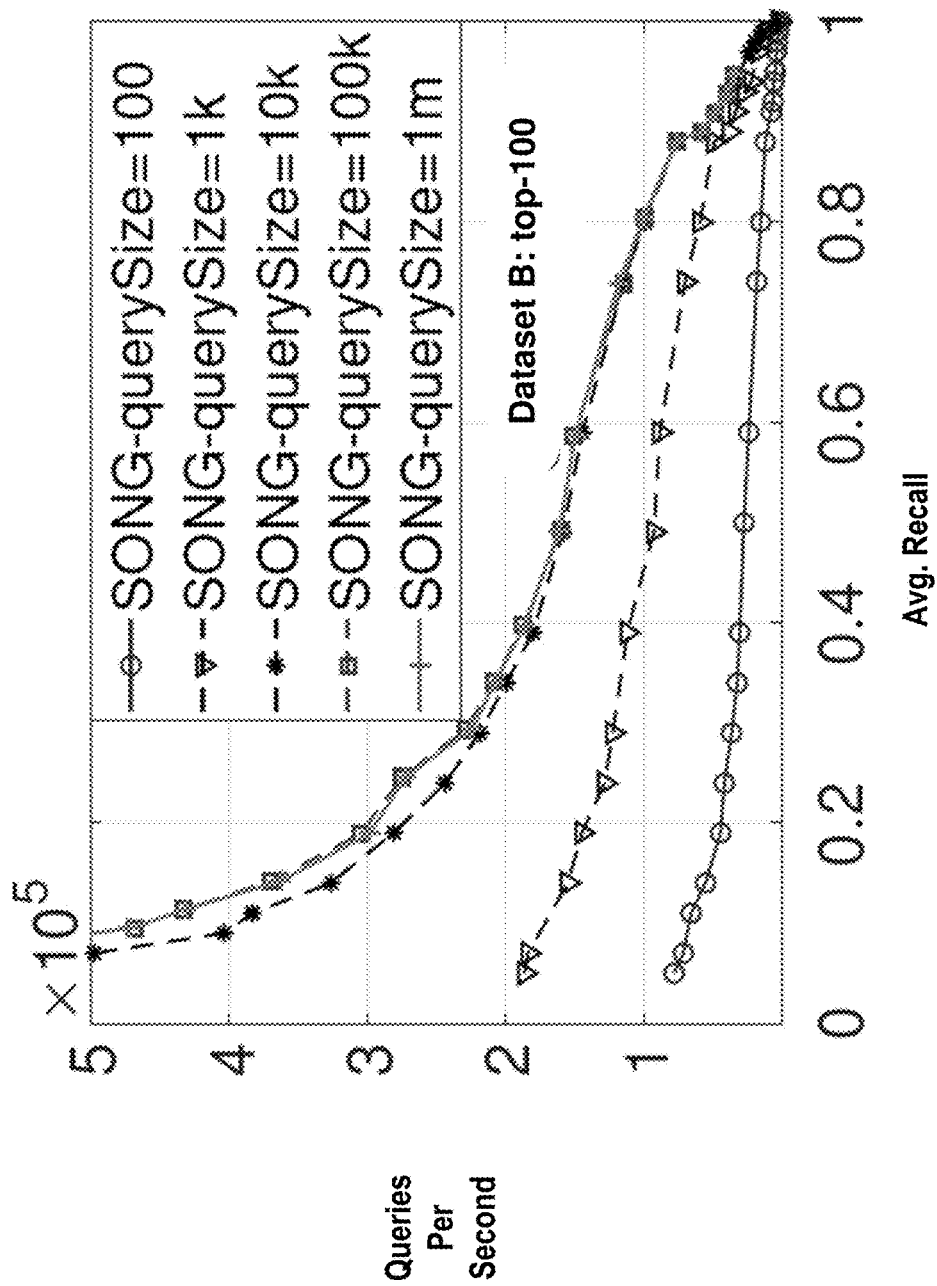
FIG. 13 depicts batch size impact results, according to embodiments of the present disclosure.

FIG. 13 illustrates the searching performance on different batch sizes, according to embodiments of the present disclosure. 100 and 1 k queries were sampled from the Dataset B queries to construct small query batches. On the other hand, in order to investigate the searching performance on large batch sizes, Dataset B query dataset was duplicated to 100 k and 1 m queries. As expected, the Query Per Second increases when there is a larger batch. The data transferring overhead within CPU memory and GPU is not negligible when there is a small batch. In addition, the thousands of cores on GPU cannot fully be used with a small number of queries. The performance gets better with larger batch since the overhead is amortized to the number of queries in the batch and there are sufficient queries for the massive parallelism on GPU. The Query Per Second reaches the top after having a batch with 100 k. Even larger batch (1 m) does not improve the performance anymore. The query batch size is 10 k in previous experiments—the speedup to HNSW can be larger when larger query batches are used.

6. Generalization to Other Graph Methods

Figure 14:
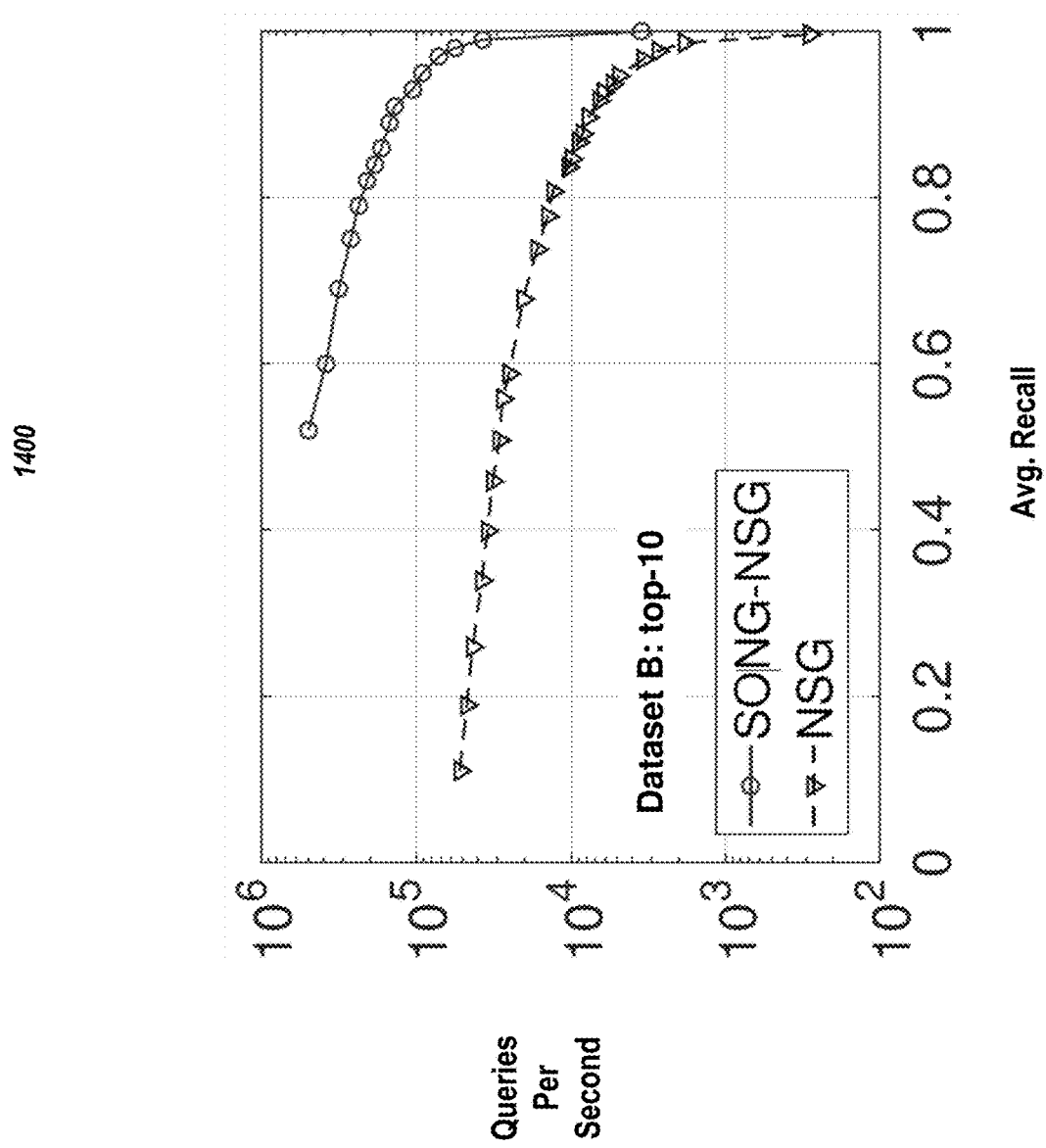
FIG. 14 depicts results of answering queries on an extracted Navigating Spreading-out Graph (NSG) index using a SONG embodiment, according to embodiments of the present disclosure.

SONG embodiments related to a general GPU framework for graph-based methods that accelerates the graph searching algorithm. Besides HNSW, SONG embodiments may be applied to other graph-based methods. Here it is shown that the generalization to Navigating Spreading-out Graph (NSG) (C. Fu et al., "Fast approximate nearest neighbor search with the navigating spreading-out graph," *VLDB* 2019) as an example. The graph index built by NSG is extracted and a SONG embodiment was employed to answer the queries on the extracted NSG index. The result is depicted in FIG. 14. For high recalls (>0.8), the SONG embodiment has a 30-37× speedup to NSG.

7. Performance on Various GPUs

Figure 15:
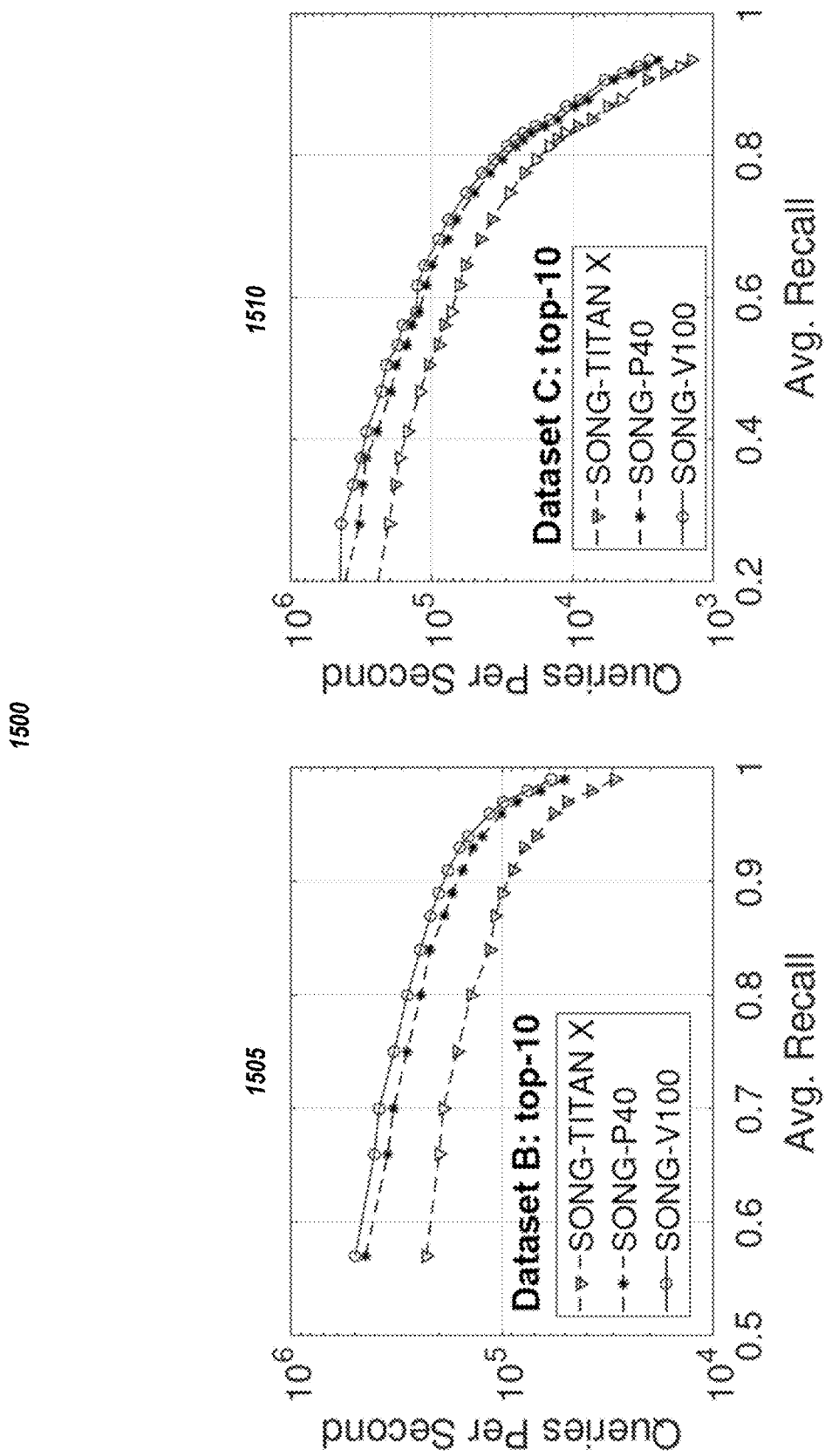
FIG. 15 demonstrates the performance of a SONG embodiment on various GPUs, according to embodiments of the present disclosure.

FIG. 15 demonstrates the performance of a SONG embodiment on various GPUs using two different datasets (datasets B 1505 and dataset C 1510), according to embodiments of the present disclosure. Three GPUs were included in the comparison: NVIDIA TESLA V100 (5,120 cores, 32 GB memory), NVIDIA TESLA P40 (3,840 cores, 24 GB memory), and NVIDIA TITAN X (3,584 cores, 12 GB memory). The performance of SONG follows the same trend on different GPUs—the same trends are shown in the figure. The gaps of these lines are consistent with the computation power of the GPUs.

8. Out-of-GPU-Memory Dataset

Figure 16:
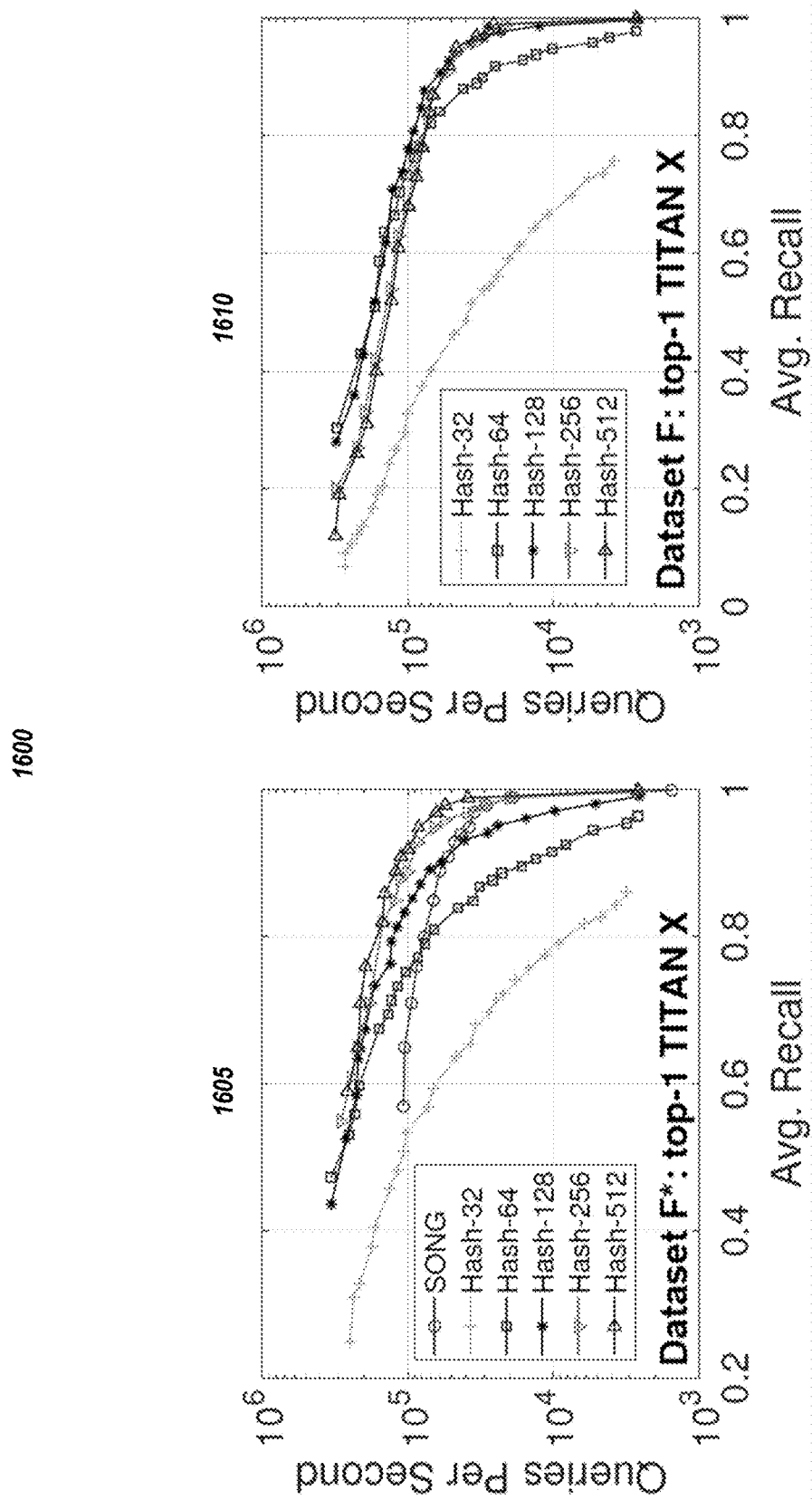
FIG. 16 depicts the effects of hashing dimension reduction, according to embodiments of the present disclosure.

The effects of hashing dimension reduction were investigated, and results are presented in FIG. 16. The experiment was performed on TITAN X to show the out-of-GPU memory scenario—TITAN X has the smallest memory (12 GB) among the three tested GPUs. Dataset F (24 GB) cannot fit in the GPU memory of TITAN X, so 1 million data points were sampled from Dataset F (to create Dataset F*) to verify performance of the hashing method embodiment. As illustrated in the left part 1605 of FIG. 16, it can be observed that the searching performance on the 128-bit hashed dataset is comparable to the original full 784-dimensional data. For the recall ranges less than 0.9, the performance of the hashed dataset is better than the original one because distance computations of hashed datasets are faster—the distance is computed in much lower dimensions than the original 784 dimensions.

Table 4 presents the hashed dataset size. With hashing, the size of the dataset becomes hundreds of times smaller and fit in the GPU memory. For example, 128-bit hashing makes the original dataset more than 190 times smaller while having comparable query performance to the original dataset. After applying the hash technique on Dataset F, it can fit in the GPU memory. The performance on hashed Dataset F has a consistent trend with Dataset F*, as shown in FIG. 16.

TABLE 4

Hashed dataset size of Dataset F.

| Hash bits | 32 | 64 | 128 | 256 | 512 | Original |
|---|---|---|---|---|---|---|
| Size (MB) | 31 | 62 | 124 | 247 | 494 | $2.4 \times 10^4$ |

9. CPU Implementation of a SONG Embodiment

Figure 17:
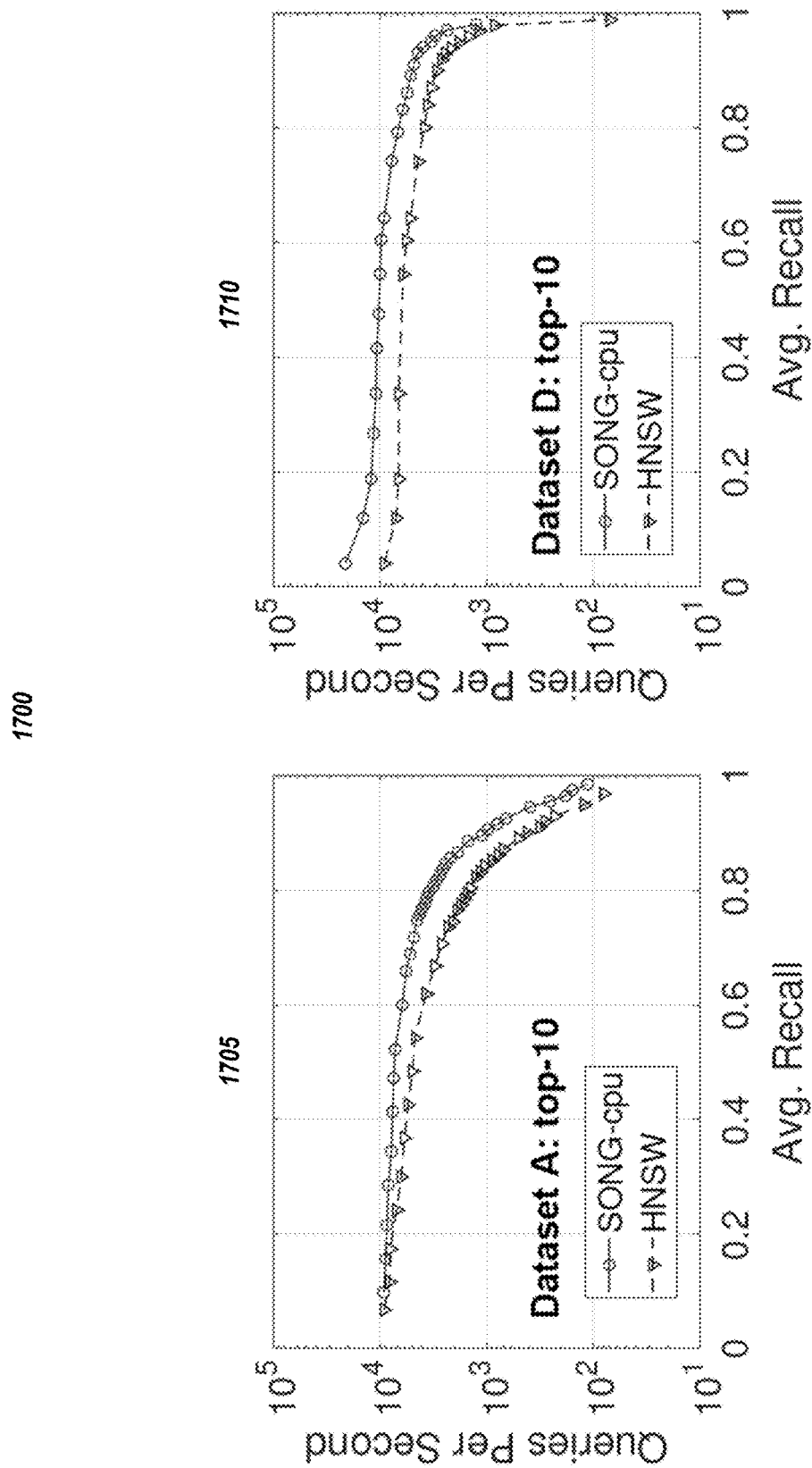
FIG. 17 depicts performance of a SONG embodiment implemented on a CPU versus an HNSW implementation on a CPU, according to embodiments of the present disclosure.

Besides the GPU optimizations, implement a CPU version of a SONG embodiment was implemented that was heavily engineered to improve the performance. As shown in FIG. 17, the CPU implementation outperforms HNSW on Dataset A 1705 and Dataset D 1710.

J. Some Related Work

ANN methods. Flann (M. Muja and D. G. Lowe, "Scalable nearest neighbor algorithms for high dimensional data," *IEEE Transactions on Pattern Analysis and Machine Intelligence*, vol. 36, issue 11, p. 2227-2240, 2014) is an ANN library based on composite tree algorithm. Annoy is based on a binary search forest. FALCONN (A. Andoni, P. Indyk, T. Laarhoven, I. Razenshteyn, and L. Schmidt, "Practical and Optimal LSH for angular distance," In *NIPS* 2015) is a multi-probe hashing ANN method. As the representative implementations in the tree-based and hash-based algorithms, their performance is inferior to graph-based methods. For graph-based methods, HNSW is based on a hierarchical graph and DPG (W. Li et al., "Approximate nearest neighbor search on high dimensional data: Experiments, analyses, and improvement," *arXiv:*1610.02455, 2016) is based on an undirected graph selected from a kNN graph. NSG contains only one graph with a navigating node where the search always starts. They share the same ANN graph searching. A SONG embodiment can accelerate most, if not all, of the algorithms in the graph-based ANN family. Faiss is the fastest GPU quantization-based ANN library.

GPU graph searching. Data layouts in GPU graph searching has been investigated. The investigation partitioned or streamed the graph to fit into the GPU memory. In ANN searching applications herein, the case that there is sufficient GPU memory was considered. iBFS (H. Liu et al., "iBFS: Concurrent Breadth-First Search on GPU," in *SIGMOD* 2016), GunRock (Y. Wang et al., "GunRock: A high-performance graph processing library on the GPU," in *SIGPLAN* 2016), Enterprise (H. Liu and H. H. Huang, "Enterprise: Breadth-first graph traversal on GPUs," in *SC* 2015), in-cache query (J. He et al., "In-cache query co-processing on coupled CPU-GPU architectures," in *VLDB* 2014), and GTS (M.-S. Kim et al., "GTS: A fast and scalable graph processing method based on streaming topology to GPUs.," in *SIGMOD* 2016) constructs multiple frontiers and search them concurrently. Embodiments of the ANN graph searching herein are different from the normal BFS—the vertex is extracted from the priority queue for the next iteration. Virtual Warp (S. Hong et al, "Accelerating CUDA graph algorithms at maximum warp," in *SIGPLAN* 2011), CuSha (F. Khorasani et al., "CuSha: Vertex-centric graph processing on GPUs," in HPDC 2014), FinePar (F. Zhang et al., "FinePar: Irregularity-aware fine-grained workload partitioning on integrated architectures," in *CGO* 2017) and MapGraph (Z. Fu et al., "MapGraph: A High Level API for Fast Development of High Performance Graph Analytics on GPUs," in *GRADES* 2014) propose methods to schedule tasks and reduce warp divergence. In ANN application embodiments herein, the searching architecture is re-designed to compute high-dimensional distances.

Maximum inner product search (MIPS). The MIPS problem has attracted a lot of attentions these days as researchers and practitioners have identified a wide range of related applications, for example, matching users with ads in sponsored search using ANN by considering a weight (such as the bid value for an ad) to each vector. Recent MIPS method embodiments adopted SONG embodiment(s) as an underlying methodology; see commonly-owned U.S. Prov. Pat. App. No. 62/929,751, titled "MOBIUS TRANSFORMATION FOR FAST INNER PRODUCT SEARCH ON GRAPH," filed on 1 Nov. 2019, and listing Shulong Tan, Zhixin Zhou, Zhaozhuo Xu, and Ping Li as inventors.

K. Some Conclusions

In this patent document, embodiments of ANN search systems and methodologies that perform graph-based ANN searching on parallel processing-enabled hardware, such as GPUs (which embodiments may be generally referred for convenience as SONG), are presented by way of illustration. Embodiments of a novel framework that decouples searching on graph method into three stages to parallel the high-dimensional distance computation are disclosed herein. A combination of data structures and optimizations for GPU ANN graph searching are also disclosed. Selected insertion and visited deletion optimizations to reduce the GPU memory consumption were presented as well. Embodiments of SONG were tested and compared against HNSW and Faiss on datasets. The results confirm the effectiveness of SONG embodiments—for example, which have 50-180× speedup compared with single-thread HNSW, while substantially outperforming Faiss.

L. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen and/or video display. The computing system may also include one or more buses operable to transmit communications between the various hardware components.

Figure 18:
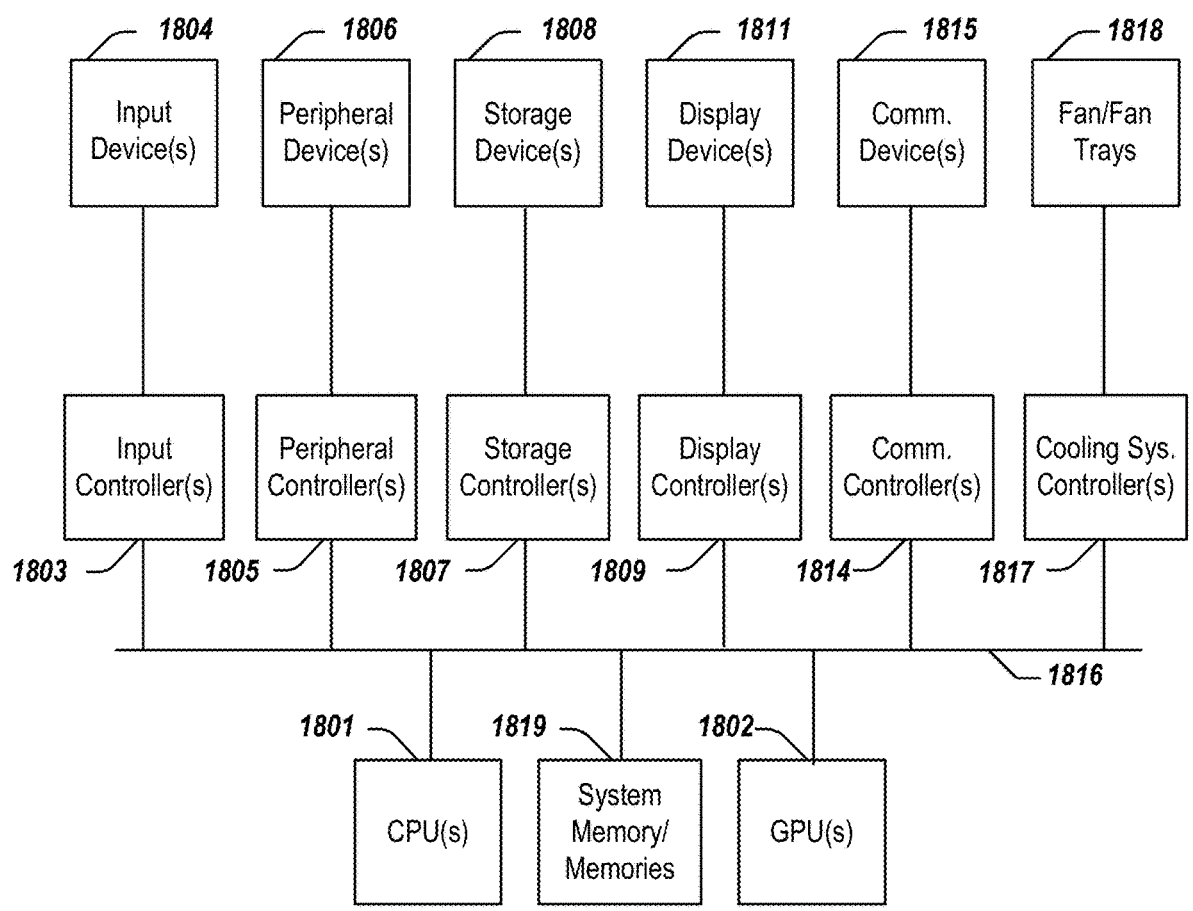
FIG. 18 depicts a simplified block diagram of a computing device/information handling system, in accordance with embodiments of the present disclosure.

FIG. 18 depicts a simplified block diagram of an information handling system (or computing system), according to embodiments of the present disclosure. It will be understood that the functionalities shown for system 1800 may operate to support various embodiments of a computing system—although it shall be understood that a computing system may be differently configured and include different components, including having fewer or more components as depicted in FIG. 18.

As illustrated in FIG. 18, the computing system 1800 includes one or more central processing units (CPU) 1801 that provide computing resources and controls the computer. CPU 1801 may be implemented with a microprocessor or the like, and may also include one or more graphics processing units (GPU) 1802 (or SIMT-type/SIMD-type processors) and/or a floating-point coprocessor for mathematical computations. In one or more embodiments, one or more GPUs 1802 may be incorporated within the display controller 1809, such as part of a graphics card or cards. The system 1800 may also include a system memory 1819, which may comprise RAM, ROM, or both.

A number of controllers and peripheral devices may also be provided, as shown in FIG. 18. An input controller 1803 represents an interface to various input device(s) 1804, such as a keyboard, mouse, touchscreen, and/or stylus. The computing system 1800 may also include a storage controller 1807 for interfacing with one or more storage devices 1808 each of which includes a storage medium such as magnetic tape or disk, or an optical medium that might be used to record programs of instructions for operating systems, utilities, and applications, which may include embodiments of programs that implement various aspects of the present disclosure. Storage device(s) 1808 may also be used to store processed data or data to be processed in accordance with the disclosure. The system 1800 may also include a display controller 1809 for providing an interface to a display device 1811, which may be a cathode ray tube (CRT) display, a thin film transistor (TFT) display, organic light-emitting diode, electroluminescent panel, plasma panel, or any other type of display. The computing system 1800 may also include one or more peripheral controllers or interfaces 1805 for one or more peripherals 1806. Examples of peripherals may include one or more printers, scanners, input devices, output devices, sensors, and the like. A communications controller 1814 may interface with one or more communication devices 1815, which enables the system 1800 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1800 comprises one or more fans or fan trays 1818 and a cooling subsystem controller or controllers 1817 that monitors thermal temperature(s) of the system 1800 (or components thereof) and operates the fans/fan trays 1818 to help regulate the temperature.

In the illustrated system, all major system components may connect to a bus 1816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact disc (CD) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as a CD and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for performing, using one or more SIMT (Single Instruction, Multiple Thread)-type or SIMD (Single Instruction, Multiple Data)-type processors, an approximate nearest neighbor search for a query point given a proximity graph comprising vertices, which represent points, and edges, which represent neighbor vertices, the method comprising:
    initializing a binary min-heap as a first priority queue, which orders vertices ascendingly by distance relative to the query point and a hash set with a default starting vertex from the proximity graph;
    constructing an empty binary max-heap as a second priority queue;
    responsive to the first priority queue not being empty:
        extracting from the first priority queue a vertex and the vertex's distance to the query point;
        responsive to the extracted vertex's distance being greater than distances associated with vertices in the second priority queue and the second priority queue is full, not adding the extracted vertex to the second priority queue;
        responsive to the extracted vertex's distance not being greater than a distance associated with at least one vertex in the second priority queue or responsive to the second priority queue not being full, adding the extracted vertex to the second priority queue based upon its distance to the query point; and
        for each vertex in the proximity graph that is a neighbor of the extracted vertex and has not already been visited:
            computing the vertex's distance to the query point;
            adding the vertex to the hash set; and
            adding the vertex to the first priority queue in order of distance to the query point; and
    responsive to the first priority queue being empty, outputting the second priority queue comprising one or more vertices as nearest neighbors or approximate nearest neighbors in the proximity graph to the query point.

2. The computer-implemented method of claim 1 wherein computing the vertex's distance to the query point is performed using a bulk distance computation in which the distance for each vertex of a plurality of vertices from the first priority queue is computed using a plurality of threads of the one or more processors, in which each thread uses a subset of dimensions of a vertex to compute a partial distance and a thread of the processor aggregates the partial distances into a distance value for each vertex of the plurality of vertices.

3. The computer-implemented method of claim 1 further comprising:
    storing at least a portion of the proximity graph as a fixed-degree adjacency list to eliminate use of an additional index look-up.

4. The computer-implemented method of claim 3 wherein a vertex is located by multiplying its index with a fixed size of a vertex.

5. The computer-implemented method of claim 1 further comprising:
    explicitly copying the query point into an on-chip shared memory to reduce processor global memory reading.

6. The computer-implemented method of claim 1 wherein the first and second priority queues and the hash set are maintained by a single thread.

7. The computer-implemented method of claim 1 wherein the steps of adding the vertex to the hash set and adding the vertex to the first priority queue in order of its distance to the query point further comprise:
   adding, subject to one or more processes, the vertex to the hash set; and
   adding, subject to one or more processes, the vertex to the first priority queue in order of its distance to the query point;
   wherein the one or more processes comprise one or more of:
   a bounded memory process;
   a selected insertion process; and
   a visited deletion process.

8. A computer-implemented method for performing, using one or more SIMT (Single Instruction, Multiple Thread)-type or SIMD (Single Instruction, Multiple Data)-type processors, an approximate nearest neighbor search for a batch of query points given a proximity graph comprising vertices, which represent points, and edges, which represent neighbor vertices, the method comprising:
   for each query point in the batch of query points:
      initializing a binary min-heap as a first priority queue, which orders vertices ascendingly by distance relative to the query point and a hash set with a default starting vertex from the proximity graph; and
      constructing an empty binary max-heap as a second priority queue;
   responsive to not all of the query points in the batch having finished processing:
      for a query point from the batch of query points that has not finished processing:
         extracting from the first priority queue corresponding to the query point a vertex and the vertex's distance to the query point;
         responsive to the extracted vertex's distance being greater than distances associated with vertices in the second priority queue and the second priority queue is full, not adding the extracted vertex to the second priority queue and marking query point being finished; and
         responsive to the extracted vertex's distance not being greater than a distance associated with at least one vertex in the second priority queue or responsive to the second priority queue not being full, adding the extracted vertex to the second priority queue based upon its distance to the query point; and
      for a query point from the batch of query points that has not finished processing:
         initializing a candidate set corresponding to the query point;
         for each vertex in the proximity graph that is a neighbor of the extracted vertex and has not already been visited, adding the vertex to the candidate set; and
         for each vertex that is a member of the candidate set:
            computing the vertex's distance to the query point;
            adding the vertex to the hash set; and
            adding the vertex to the first priority queue in order of its distance to the query point; and
   responsive to all of the query points in the batch having finished processing, outputting for each query point in the batch its second priority queue comprising one or more vertices as nearest neighbors or approximate nearest neighbors in the proximity graph to the query point.

9. The computer-implemented method of claim 8 wherein computing the vertex's distance to the query point is performed using a bulk distance computation in which the distance for each vertex of a plurality of vertices from the candidate set is computed using a plurality of threads of the one or more processors, in which each thread uses a subset of dimensions of a vertex to compute a partial distance and a thread of the processor aggregates the partial distances into a distance value for each vertex of the plurality of vertices.

10. The computer-implemented method of claim 8 further comprising:
    storing at least a portion of the proximity graph as a fixed-degree adjacency list to eliminate use of an additional index look-up.

11. The computer-implemented method of claim 10 wherein a vertex is located by multiplying its index with a fixed size of a vertex.

12. The computer-implemented method of claim 8 further comprising:
    explicitly copying the query point into an on-chip shared memory to reduce processor global memory reading.

13. The computer-implemented method of claim 8 wherein the first and second priority queues and the hash set are maintained by a single thread.

14. The computer-implemented method of claim 8 wherein the steps of adding the vertex to the hash set and adding the vertex to the first priority queue in order of its distance to the query point further comprise:
    adding, subject to one or more processes, the vertex to the hash set; and
    adding, subject to one or more processes, the vertex to the first priority queue in order of its distance to the query point;
    wherein the one or more processes comprise one or more of:
    a bounded memory process;
    a selected insertion process; and
    a visited deletion process.

15. The computer-implemented method of claim 8 wherein each vertex in the candidate set is allocated using a fixed-length array in shared memory.

16. A non-transitory computer-readable medium or media comprising one or more sequences of instructions which, when executed by one or more SIMT (Single Instruction, Multiple Thread)-type or SIMD (Single Instruction, Multiple Data)-type processors, causes steps for performing an approximate nearest neighbor search for a query point given a proximity graph comprising vertices, which represent points, and edges, which represent neighbor vertices, the steps comprising:
    initializing a binary min-heap as a first priority queue, which orders vertices ascendingly by distance relative to the query point and a hash set with a default starting vertex from the proximity graph;
    constructing an empty binary max-heap as a second priority queue;
    responsive to the first priority queue not being empty:
       extracting from the first priority queue a vertex and the vertex's distance to the query point;
       responsive to the extracted vertex's distance being greater than distances associated with vertices in the second priority queue and the second priority queue is full, not adding the extracted vertex to the second priority queue;

responsive to the extracted vertex's distance not being greater than a distance associated with at least one vertex in the second priority queue or responsive to the second priority queue not being full, adding the extracted vertex to the second priority queue based upon its distance to the query point; and for each vertex in the proximity graph that is a neighbor of the extracted vertex and has not already been visited:

computing the vertex's distance to the query point;
adding the vertex to the hash set; and
adding the vertex to the first priority queue in order of its distance to the query point; and responsive to the first priority queue being empty, outputting the second priority queue comprising one or more vertices as nearest neighbors or approximate nearest neighbors in the proximity graph to the query point.

17. The non-transitory computer-readable medium or media of claim 16 wherein computing the vertex's distance to the query point is performed using a bulk distance computation in which the distance for each vertex of a plurality of vertices from the first priority queue is computed using a plurality of threads of the one or more processors, in which each thread uses a subset of dimensions of a vertex to compute a partial distance and a thread of the processor aggregates the partial distances into a distance value for each vertex of the plurality of vertices.

18. The non-transitory computer-readable medium or media of claim 16 wherein the steps further comprise:
storing at least a portion of the proximity graph as a fixed-degree adjacency list to eliminate use of an additional index look-up.

19. The non-transitory computer-readable medium or media of claim 16 wherein the first and second priority queues and the hash set are maintained by a single thread.

20. The non-transitory computer-readable medium or media of claim 16 wherein the steps of adding the vertex to the hash set and adding the vertex to the first priority queue in order of its distance to the query point further comprise:
adding, subject to one or more processes, the vertex to the hash set; and
adding, subject to one or more processes, the vertex to the first priority queue in order of its distance to the query point;
wherein the one or more processes comprise one or more of:
a bounded memory process;
a selected insertion process; and
a visited deletion process.

\* \* \* \* \*